(12) United States Patent
Matsushima et al.

(10) Patent No.: US 11,449,725 B2
(45) Date of Patent: Sep. 20, 2022

(54) ANTENNA DEVICE AND IC CARD HAVING THE SAME

(71) Applicant: TDK Corporation, Tokyo (JP)

(72) Inventors: Masaki Matsushima, Tokyo (JP); Noritaka Chiyo, Tokyo (JP); Tomohiro Moriki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 16/862,818

(22) Filed: Apr. 30, 2020

(65) Prior Publication Data

US 2020/0380332 A1 Dec. 3, 2020

(30) Foreign Application Priority Data

May 28, 2019 (JP) .............................. JP2019-099247

(51) Int. Cl.
  *G06K 19/06* (2006.01)
  *G06K 19/077* (2006.01)
  *H01Q 1/22* (2006.01)
  *H01Q 7/00* (2006.01)

(52) U.S. Cl.
  CPC .  *G06K 19/07779* (2013.01); *G06K 19/07756* (2013.01); *H01Q 1/2283* (2013.01); *H01Q 7/00* (2013.01)

(58) Field of Classification Search
  CPC ...................................................... H01F 38/14
  USPC ................................................ 235/492, 487
  See application file for complete search history.

(56) References Cited

U.S. PATENT DOCUMENTS

| 2012/0098724 | A1* | 4/2012 | Yosui ..................... H01Q 1/243 343/788 |
| 2012/0112971 | A1* | 5/2012 | Takeyama .............. H01Q 1/243 343/702 |
| 2014/0209691 | A1* | 7/2014 | Finn ..................... H05K 1/0233 235/492 |
| 2014/0375262 | A1* | 12/2014 | Yamaguchi ............. H02J 50/90 320/108 |
| 2019/0171923 | A1* | 6/2019 | Finn ......................... B32B 7/12 |

FOREIGN PATENT DOCUMENTS

| EP | 1031939 | * 6/2000 | ............ G06K 19/00 |
| JP | 11-149536 A | 6/1999 | |
| JP | 2008-067057 A | 3/2008 | |

* cited by examiner

*Primary Examiner* — Daniel St. Cyr
(74) *Attorney, Agent, or Firm* — McDermott Will & Emery LLP

(57) ABSTRACT

Disclosed herein is an antenna device that includes a substrate, a conductor pattern formed on the substrate, and a magnetic sheet formed on the substrate. The conductor pattern includes a spiral or loop-shaped antenna coil and a spiral or loop-shaped coupling coil connected to the antenna coil and having a diameter smaller than that of the antenna coil. The antenna coil overlaps the magnetic sheet. The magnetic sheet has a first opening at a position overlapping the coupling coil such that an inner diameter area of the coupling coil completely overlaps the first opening in a plan view.

9 Claims, 21 Drawing Sheets

ANTENNA DEVICE AND IC CARD HAVING THE SAME

BACKGROUND OF THE INVENTION

Field of the Invention

The present invention relates to an antenna device and an IC card having the antenna device and, more particularly, to an antenna device including a coupling coil electromagnetically coupled to an IC module and an antenna coil electromagnetically coupled to a card reader and an IC card provided with the antenna device having such a configuration.

Description of Related Art

IC cards having an IC module have been widely used recently. For example, JP H11-149536A and JP 2008-067057A disclose an IC card including a coupling coil electromagnetically coupled to an IC module and an antenna coil electromagnetically coupled to a card reader. Having such a coupling coil electromagnetically coupled to the IC module, the IC cards described in JP H11-149536A and JP 2008-067057A can feed electrical power and transmit/receive signals with respect to the IC module without directly connecting the antenna coil and the IC module.

Further, recently, there may be a case where a metal plate is used for the IC card body for the purpose of enhancing the texture of the IC card. In this case, however, when the metal plate and antenna coil directly are made to overlap each other, communication is blocked by the metal plate. Therefore, in IC cards of this type, it is necessary to interpose a magnetic sheet between the metal plate and the antenna coil.

However, in a configuration where the IC module is disposed on the metal plate side, if the magnetic sheet is present between the metal plate and a coupling coil, electromagnetic coupling between the IC module and the coupling coil may be blocked by the magnetic sheet.

SUMMARY

It is therefore an object of the present invention to provide an antenna device having an antenna coil, a coupling coil, and a magnetic sheet, capable of achieving reliable electromagnetic coupling between, for example, an IC module positioned on the magnetic sheet side and the coupling coil, and an IC card having the antenna device.

An antenna device according to the present invention includes: a substrate; and a conductor pattern and a magnetic sheet which are formed on the surface of the substrate. The conductor pattern includes a spiral or loop-shaped antenna coil and a spiral or loop-shaped coupling coil connected to the antenna coil and having a diameter smaller than that of the antenna coil. The antenna coil overlaps the magnetic sheet. The magnetic sheet has a first opening at a position overlapping the coupling coil and, thus, the inner diameter area of the coupling coil completely overlaps the first opening in a plan view.

According to the present invention, the inner diameter area of the coupling coil and the magnetic sheet do not overlap each other, allowing, for example, an IC module positioned on the magnetic sheet side to be electromagnetically coupled to the coupling coil.

In the present invention, the coil area of the coupling coil may completely overlap the first opening in a plan view.

With this configuration, coupling between the coupling coil and, for example, an IC module positioned on the magnetic sheet side can be enhanced.

In the present invention, the coupling coil may be formed on a surface of the substrate that is opposite to the surface facing the magnetic sheet. With this configuration, the coupling coil is not damaged in a process of forming the first opening in the magnetic sheet.

An IC card according to the present invention includes the above-described antenna device, a metal plate provided overlapping the antenna device, and an IC module electromagnetically coupled to a coupling coil. The metal plate has a second opening. The IC module is disposed in the second opening. The coupling coil and the IC module are electromagnetically coupled through the first opening.

According to the present invention, the IC module and the coupling coil can be electrically coupled to each other without being blocked by the magnetic sheet.

As described above, according to the present invention, there can be provided an antenna device having an antenna coil, a coupling coil, and a magnetic sheet, capable of achieving reliable electromagnetic coupling between, for example, an IC module positioned on the magnetic sheet side and the coupling coil, and an IC card having the antenna device.

BRIEF DESCRIPTION OF THE DRAWINGS

The above features and advantages of the present invention will be more apparent from the following description of certain preferred embodiments taken in conjunction with the accompanying drawings, in which:

FIG. 8A is a plan view, FIG. 8B is a cross-sectional view, and FIG. 8C is a cross sectional view according to a modification;

DETAILED DESCRIPTION OF THE EMBODIMENTS

Preferred embodiments of the present invention will be explained below in detail with reference to the accompanying drawings.

First Embodiment

Figure 1:
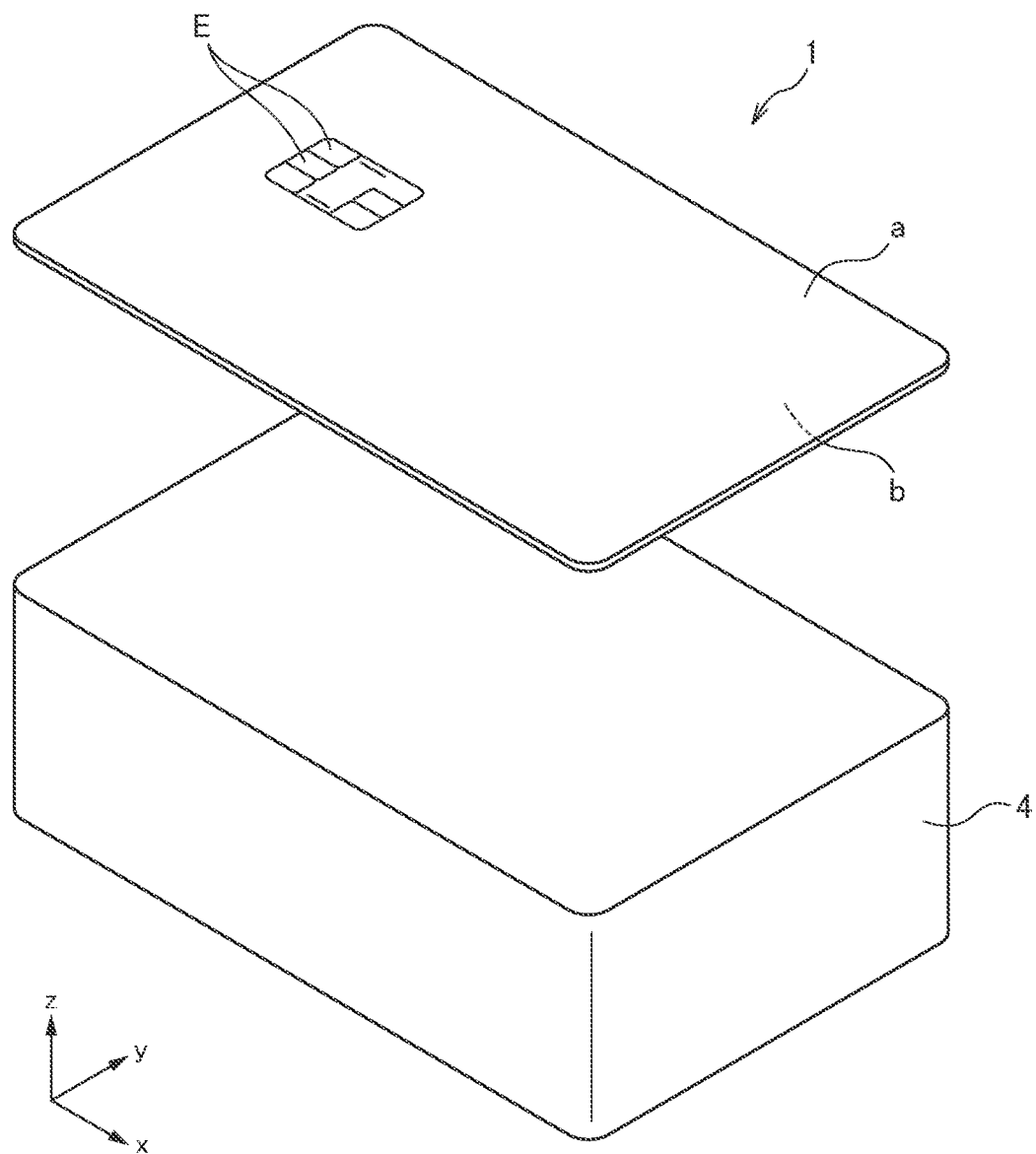
FIG. 1 is a schematic perspective view illustrating the outer appearance of an IC card according to a first embodiment of the present invention.

FIG. 1 is a schematic perspective view illustrating the outer appearance of an IC card 1 according to the first embodiment of the present invention.

As illustrated in FIG. 1, an IC card 1 according to the present embodiment is a plate-like member having the x-direction as the longitudinal direction, y-direction as the lateral direction, and Z-direction as the thickness direction and has an upper surface a and a back surface b each of which constitutes the xy plane. The IC card incorporates therein an IC module to be described later, and a terminal electrode E of the IC module is exposed to the upper surface a of the IC card 1. The IC card 1 can perform communication with a card reader 4 in a state where the back surface b faces the card reader 4.

Figure 2:
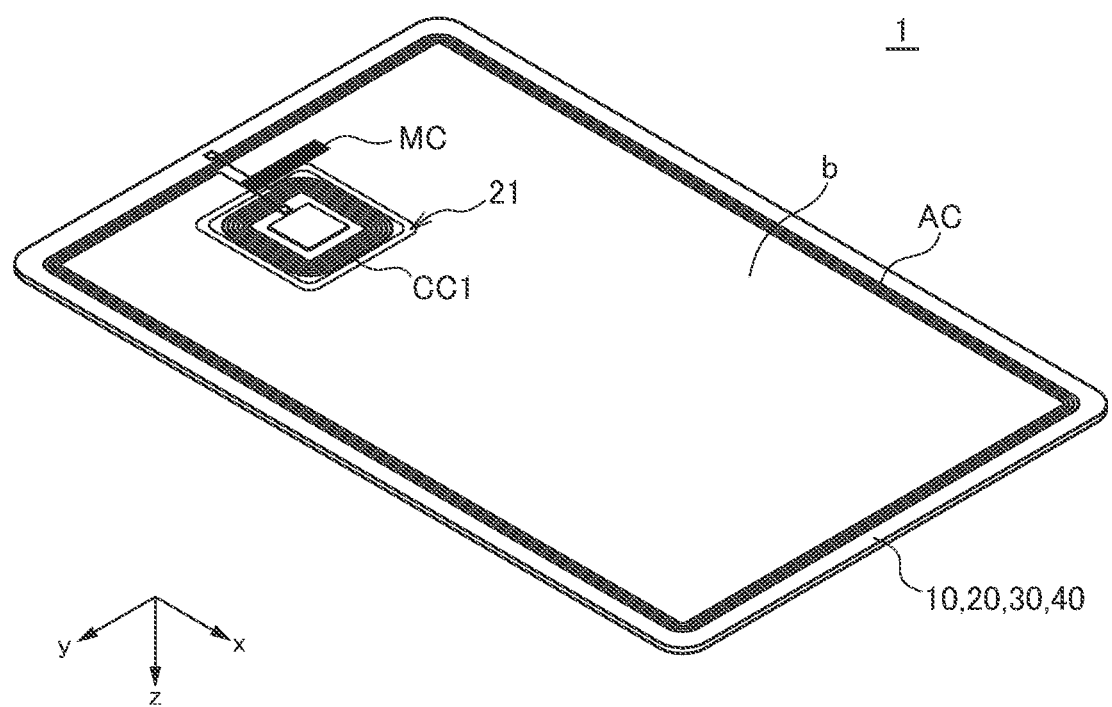
FIG. 2 is a schematic transparent perspective view of the IC card shown in FIG. 1 as viewed from the back surface side.
Figure 3:
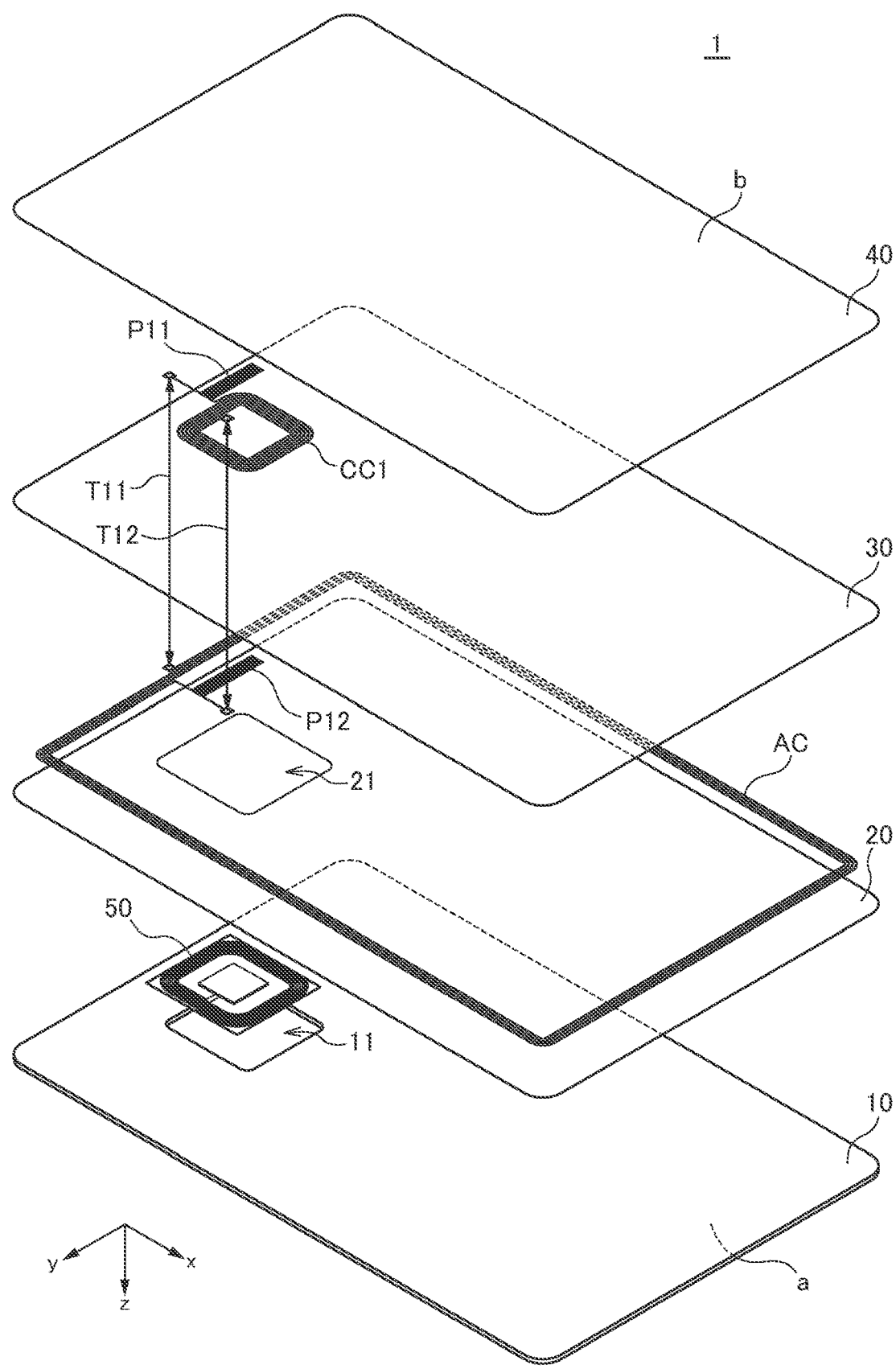
FIG. 3 is a schematic exploded perspective view of the IC card shown in FIG. 1.

FIG. 2 is a schematic transparent perspective view of the IC card 1 as viewed from the back surface b side, and FIG. 3 is a schematic exploded perspective view of the IC card 1.

As illustrated in FIGS. 2 and 3, the IC card 1 according to the present embodiment has a structure in which a metal plate 10, a magnetic sheet 20, a substrate 30, and a cover layer 40 are laminated in this order from the upper surface a side toward the back surface b side. The metal plate 10 is made of a metal material such as stainless or titanium, and one surface thereof serves as the upper surface a of the IC card 1. The metal plate 10 has an opening 11, in which an IC module 50 is disposed.

The substrate 30 is a film made of an insulating resin material such as PET and has a conductive pattern on both surfaces thereof to constitute an antenna device. The thickness of the substrate 30 can be, but is not particularly limited to, 20 μm to 30 μm.

Figure 4:
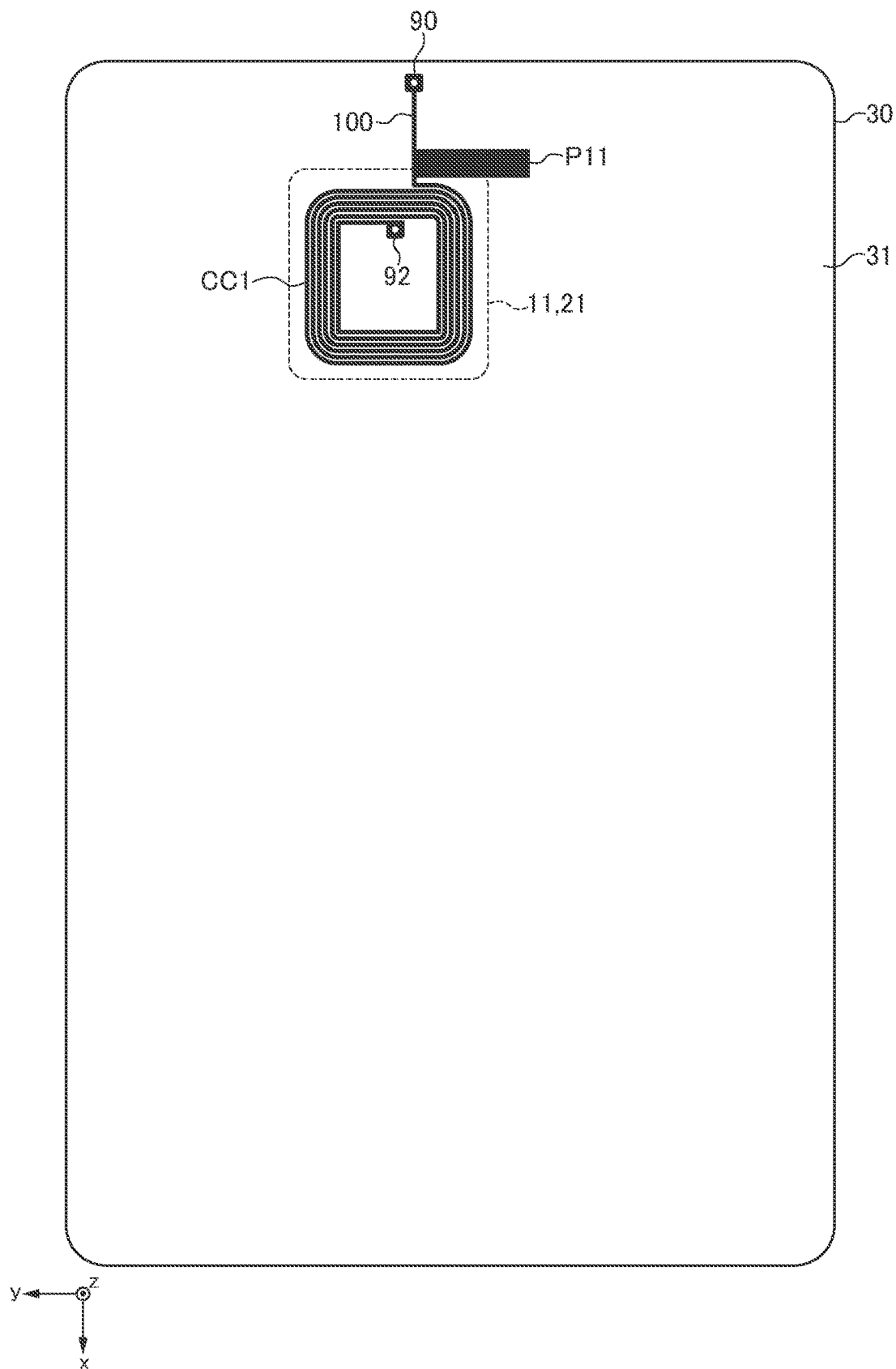
FIG. 4 is a schematic plan view illustrating a conductor pattern formed on one surface of the substrate, in the first embodiment of the present invention.
Figure 5:
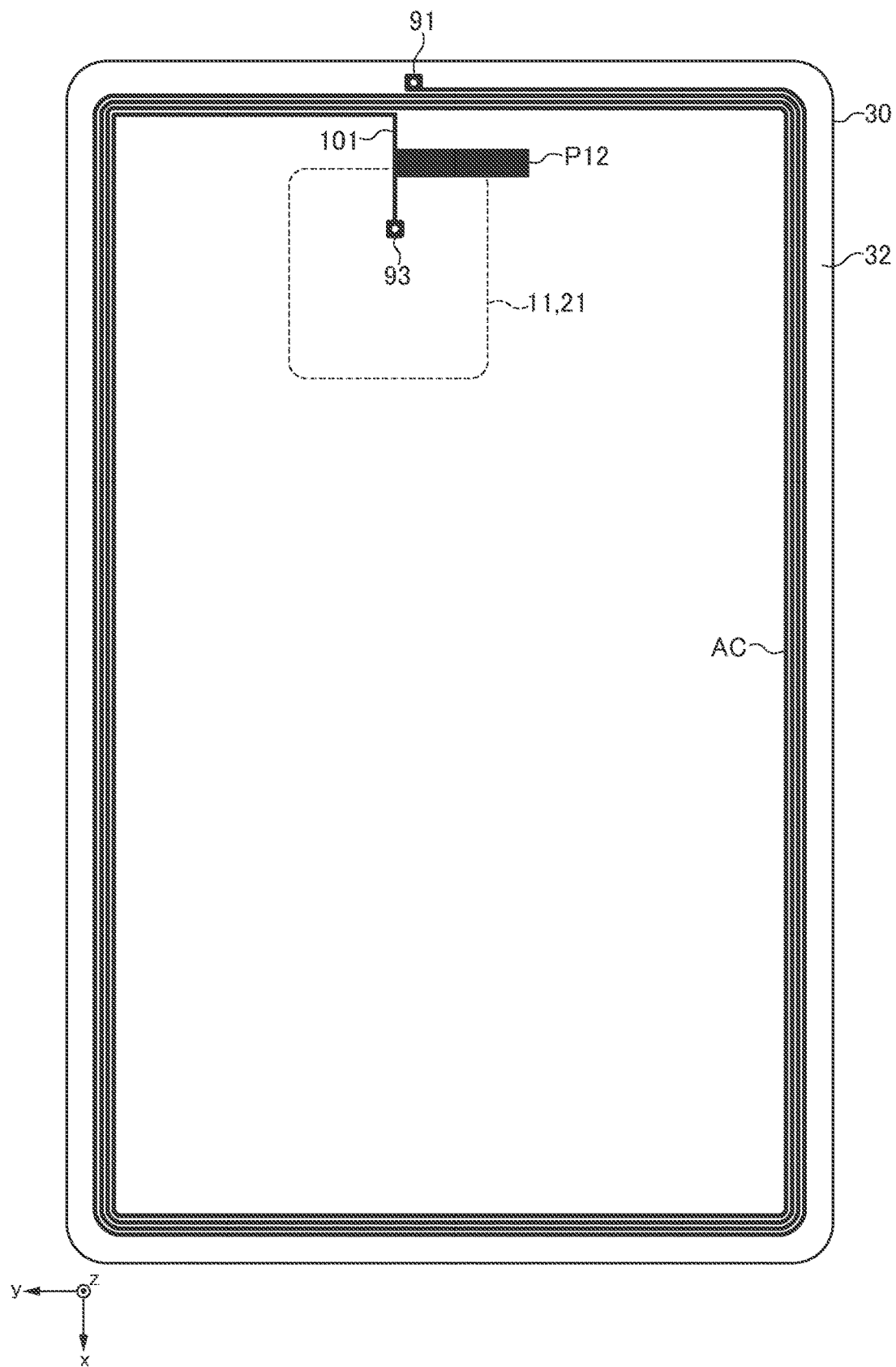
FIG. 5 is a schematic transparent plan view of a conductor pattern formed on the other surface of the substrate as viewed from the one surface side, in the first embodiment of the present invention.
Figure 6:
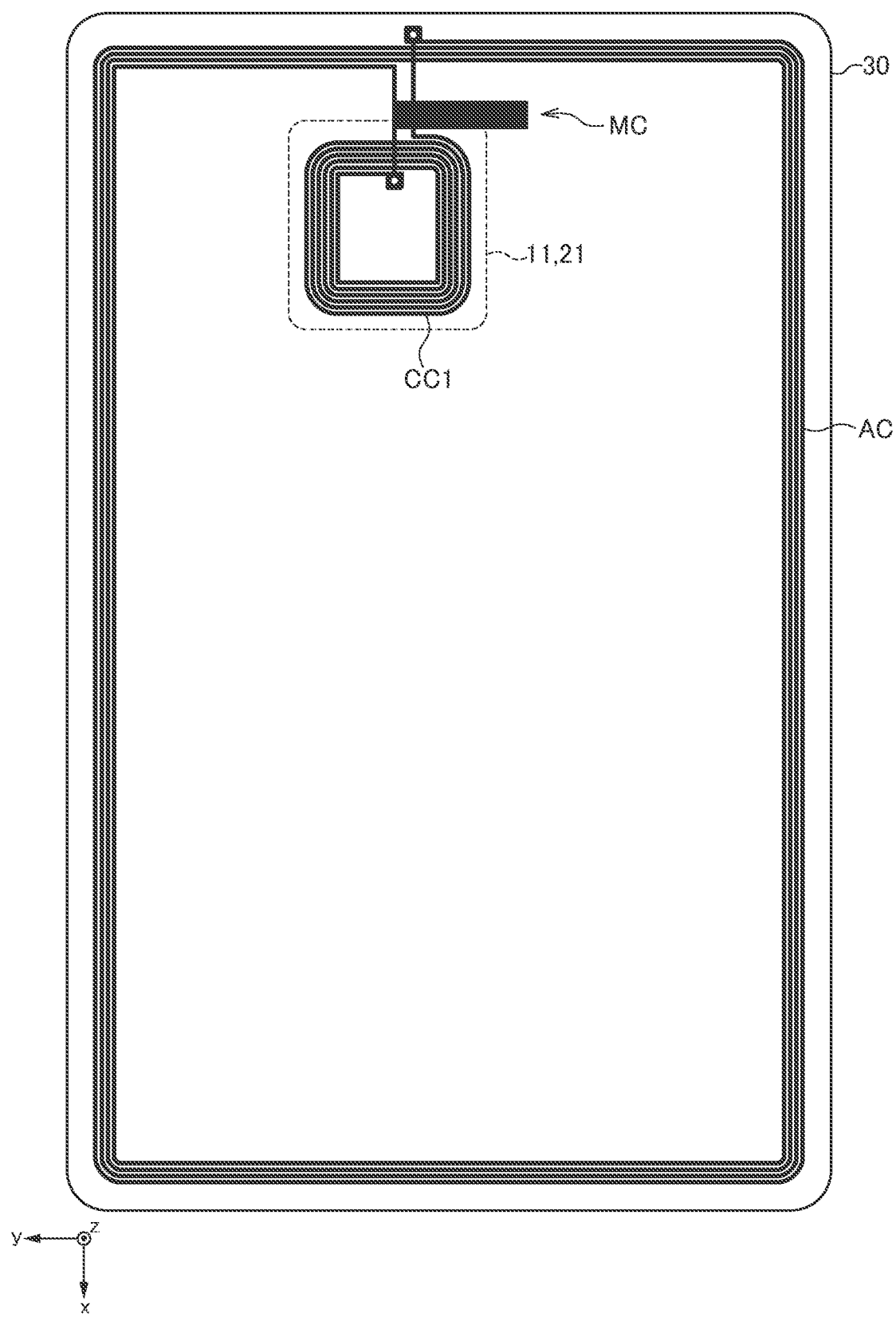
FIG. 6 is a schematic transparent plan view illustrating the conductor pattern formed on the one surface and the conductor pattern formed on the other surface in an overlapping manner, in the first embodiment of the present invention.

FIG. 4 is a schematic plan view illustrating a conductor pattern formed on one surface 31 of the substrate 30, in the first embodiment. FIG. 5 is a schematic transparent plan view of a conductor pattern formed on the other surface 32 of the substrate 30 as viewed from the one surface 31 side, in the first embodiment. FIG. 6 is a schematic transparent plan view illustrating the conductor pattern formed on the one surface 31 and the conductor pattern formed on the other surface 32 in an overlapping manner, in the first embodiment.

As illustrated in FIG. 4, the conductor pattern provided on the one surface 31 of the substrate 30 includes a coupling coil CC1, a capacitor electrode pattern P11, and a connection pattern 100. The coupling coil CC1 is spirally wound by, e.g., five turns. However, the coupling coil CC1 may not necessarily be wound by a plurality of turns and may be a loop of one turn.

The outer peripheral end of the coupling coil CC1 is connected to a connection node 90 through the connection pattern 100. The connection pattern 100 is connected with the capacitor electrode pattern P11. The connection node 90 is connected to a connection node 91 provided on the other surface 32 of the substrate 30 through a through hole conductor T11 penetrating the substrate 30. On the other hand, an inner peripheral end 92 of the coupling coil CC1 is connected to a connection node 93 provided on the other surface 32 of the substrate 30 through a through hole conductor T12 penetrating the substrate 30.

As illustrated in FIG. 5, the conductor pattern provided on the other surface 32 of the substrate 30 includes an antenna coil AC, a capacitor electrode pattern P12, and a connection pattern 101. The antenna coil AC is a loop antenna spirally wound by, e.g., four turns along the four sides of the substrate 30 having a rectangular shape. Since the antenna coil AC is disposed along the four sides of the substrate 30, a large part of the other surface 32 of the substrate 30 serves as the inner diameter area of the antenna coil AC. However, the antenna coil AC may not necessarily be wound by a plurality of turns and may be a loop of one turn.

The outer peripheral end of the antenna coil AC is connected to the connection node 91. This short-circuits the outer peripheral end of the antenna coil AC and the outer peripheral end of the coupling coil CC1. On the other hand, the inner peripheral end of the antenna coil AC is connected to the connection node 93 through the connection pattern 101. This short-circuits the inner peripheral end of the antenna coil AC and the inner peripheral end of the coupling coil CC1. The connection pattern 101 is connected with the capacitor electrode pattern P12. The capacitor electrode pattern P12 is provided at a position overlapping the capacitor electrode pattern P11 in a plan view.

With the above configuration, the antenna coil AC and the coupling coil CC1 are connected in series, and a matching capacitor MC constituted by the capacitor electrode patterns P11 and P12 is inserted into the connecting portion therebetween. Thus, the antenna coil AC and the coupling coil CC1 do not each have an external terminal for direct current connection and are each a completely closed circuit in terms of direct current.

The coupling coil CC1 is disposed at a position overlapping the opening 11 of the metal plate 10 so as to overlap the IC module 50. The opening 11 of the metal plate 10 is formed at a position offset in the negative x-direction of the substrate 30, i.e., to one short side of the substrate and, accordingly, the coupling coil CC1 is likewise disposed offset. Similarly, the matching capacitor MC constituted by the capacitor electrode patterns P11 and P12, being in the vicinity of the coupling coil CC1, is disposed offset to the one short side of the substrate 30.

As illustrated in FIG. 3, the magnetic sheet 20 is formed directly on the surface of the substrate 30 so as to be disposed between the metal plate 10 and the substrate 30. The material of the magnetic sheet 20 is not particularly limited as long as it has high permeability and may be a bulk body of ferrite or a metal magnetic material, or may be a composite magnetic material obtained by mixing a resin material and ferrite powder or metal magnetic powder. When a composite magnetic material is used as the material of the magnetic sheet 20, a mixture of an uncured resin material and ferrite powder or metal magnetic powder is applied on the surface of the substrate 30, followed by curing of the resin material, whereby the magnetic sheet 20 made of the composite magnetic material can be directly formed on the surface of the substrate 30. The magnetic sheet 20 has a planar size slightly larger than that of the outer shape of the antenna coil AC and thereby functions as a magnetic path for magnetic flux interlinking with the antenna coil AC. The IC card 1 according to the present embodiment has the metal plate 10 made of a metal material, so that when the metal plate 10 and the substrate 30 are made to directly overlap each other, communication becomes difficult; however, when the magnetic sheet 20 is interposed between the metal plate 10 and the substrate 30, communication becomes possible.

The magnetic sheet 20 has an opening 21 at a position overlapping the coupling coil CC1. Thus, the coupling coil CC1 and IC module 50 directly face each other without the magnetic sheet 20.

Figure 7:
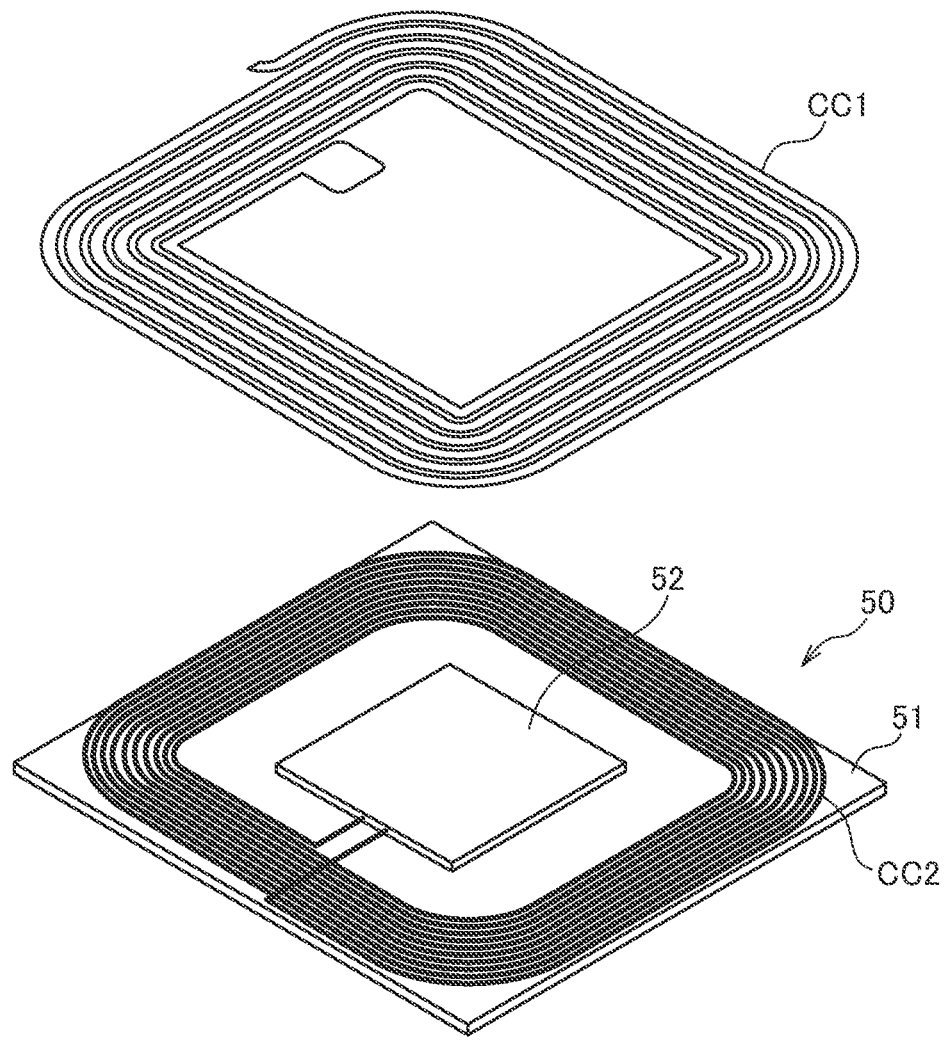
FIG. 7 is a schematic perspective view of the IC module as viewed from the back surface side.

FIG. 7 is a schematic perspective view of the IC module 50 as viewed from the back surface side.

As illustrated in FIG. 7, the IC module 50 includes a module substrate 51 and an IC chip 52 mounted on or incorporated in the module substrate 51, and a coupling coil CC2 is formed on the back surface of the module substrate 51. The terminal electrode E illustrated in FIG. 1 is provided on the front surface (upper surface) side of module substrate 51. The inner diameter size and outer diameter size of the coupling coil CC2 are substantially the same as those of the coupling coil CC1 provided on the substrate 30, so that when the coupling coils CC1 and CC2 are made to overlap each other, electromagnetic coupling is generated. As a result, it is possible to connect the IC module 50 and the antenna coil AC in an alternating current manner through the coupling coils CC1 and CC2 without directly connecting them using a terminal electrode.

Figure 8A:
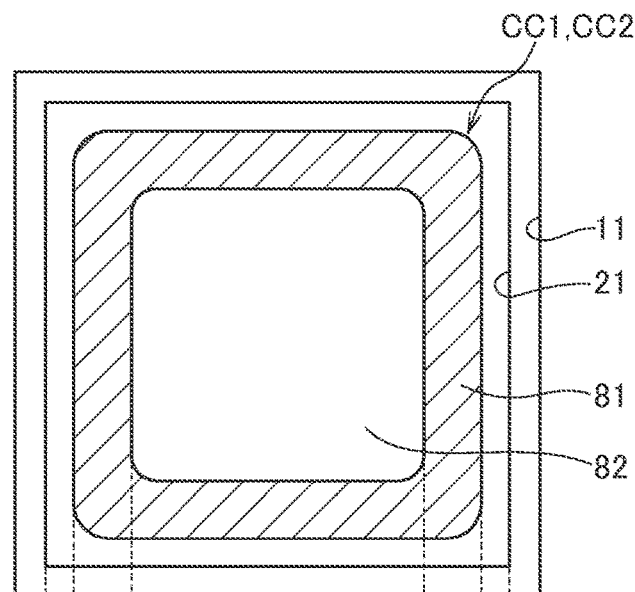
FIGS. 8A to 8C are views illustrating a preferred relationship between the coupling coils and openings, where
Figure 8B:
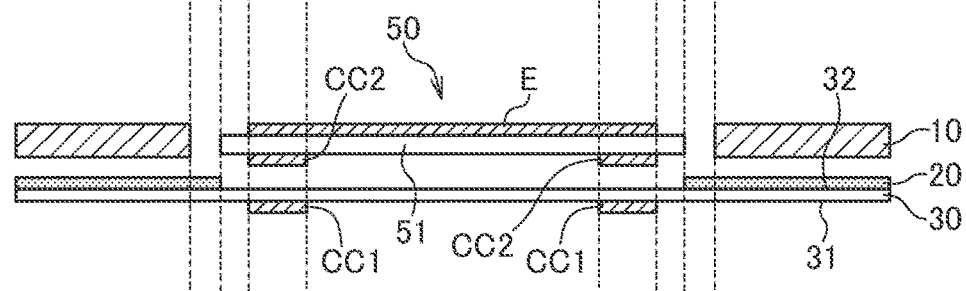
Figure 8C:
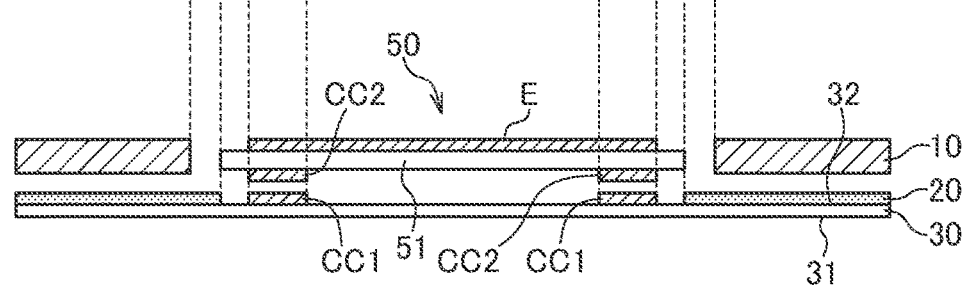

FIGS. 8A to 8C are views illustrating a preferred relationship between the coupling coils CC1, CC2 and openings 11 and 21. FIG. 8A is a plan view, FIG. 8B is a cross-sectional view, and FIG. 8C is a cross sectional view according to a modification.

In FIG. 8A, reference numeral 81 denotes the coil area of the coupling coil (CC1, CC2), i.e., an area corresponding to the conductor pattern that is positioned between the outermost turn and the innermost turn, of the coupling coil, and reference numeral 82 denotes the inner diameter area of the coupling coil (CC1, CC2), i.e., an area surrounded by the innermost turn of the coupling coil. As illustrated in FIG. 8A, the inner diameter area 82 and coil area 81 completely overlap the opening 21. As a result, the magnetic sheet 20 is completely absent between the inner diameter area 82 and coil area 81 of the coupling coil CC1 and the inner diameter area 82 and coil area 81 of the coupling coil CC2, thus preventing the electromagnetic coupling between the coupling coil CC1 and the coupling coil CC2 from being blocked by the magnetic sheet 20.

However, in the present invention, it is not essential that the coil area 81 completely overlaps the opening 21, but the magnetic sheet 20 may partially overlap the coil area 81. Even in this case, the inner diameter area 82 should completely overlaps the opening 21 in order to ensure sufficient coupling between the coupling coils CC1 and CC2. Further, as illustrated in FIG. 8A, the opening 11 of the metal plate 10 is larger in size than the opening 21 of the magnetic sheet 20; however, this is not essential, and the opening 21 of the magnetic sheet 20 may be larger in size than the opening 11 of the metal plate 10, or the openings 21 and 22 may be equal in size.

Further, in the present embodiment, as illustrated in FIG. 8B, the coupling coil CC1 is formed on the one surface 31 of the substrate 30, i.e., the surface of the substrate 30 that is opposite to the other surface 32 facing the magnetic sheet 20; however, as in the modification illustrated in FIG. 8C, the coupling coil CC1 may be formed on the other surface 32 of the substrate 30, i.e., the surface of the substrate 30 that faces the magnetic sheet 20. In the former case, even when a composite magnetic material that has been applied onto the other surface 32 of the substrate 30 is partially removed to form the opening 21, the coupling coil CC1 is not damaged during the partial removal of the composite magnetic material. In this case, the connection pattern 101 illustrated in FIG. 5 is subject to the removal process of the composite magnetic material, and when the damage to the connection pattern 101 may become significant, the conductor width of the connection pattern 101 is designed to be larger than those of the other patterns such as the coupling coil CC1. In the latter case, the distance between the coupling coils CC1 and CC2 is reduced, thereby further enhancing the coupling strength therebetween.

Figure 9:
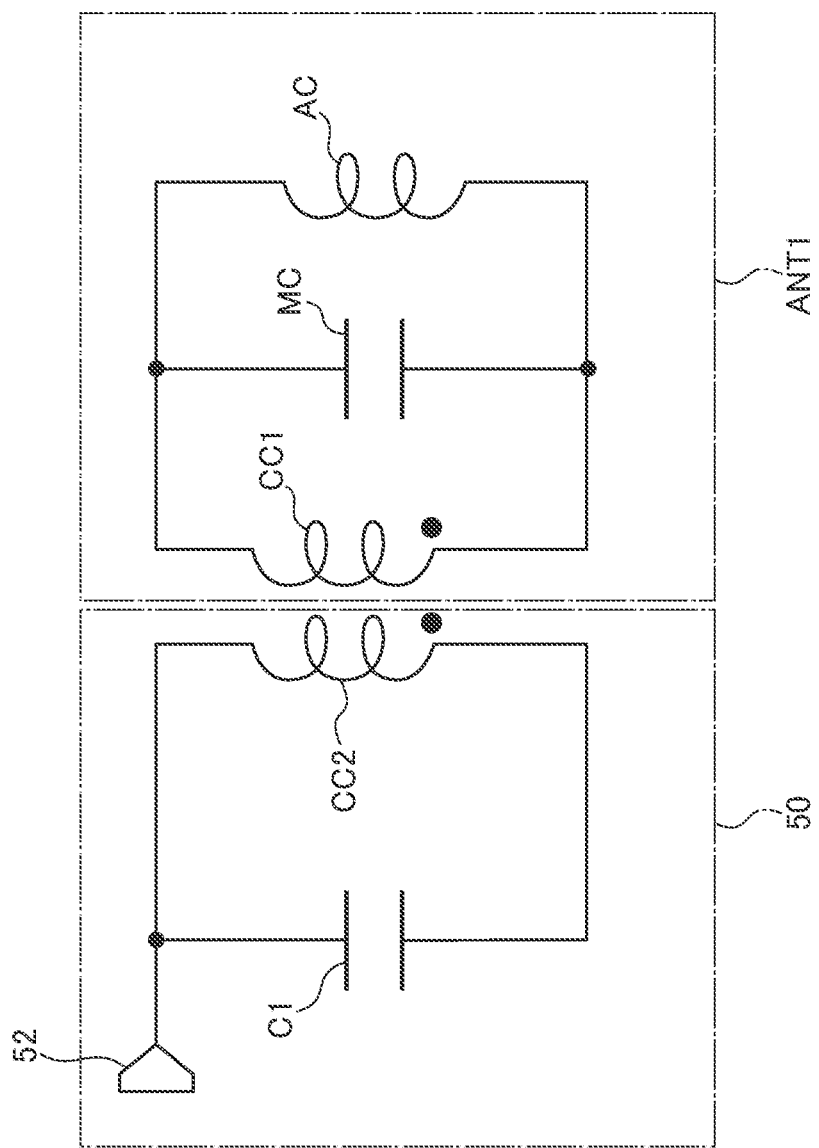
FIG. 9 is an equivalent circuit diagram of the IC card according to a first embodiment of the present invention.

FIG. 9 is an equivalent circuit diagram of the IC card 1 according to the first embodiment.

As illustrated in FIG. 9, in the first embodiment, one end of the antenna coil AC and one end of the coupling coil CC1 are connected to each other, the other end of the antenna coil AC and the other end of the coupling coil CC1 are connected to each other, and the matching capacitor MC is connected to these connection points, thereby constituting a main antenna ANT1. The antenna coil AC included in the main antenna ANT1 communicates with the card reader 4 shown in FIG. 1. The coupling coil CC1 included in the main antenna ANT1 is electromagnetically coupled to the coupling coil CC2 included in the IC module 50. The coupling coil CC2 is connected in parallel to an input capacitor C1, and one end of the input capacitor C1 is connected to the input terminal of the IC chip 52.

As described above, the IC card 1 according to the first embodiment has the magnetic sheet 20 between the substrate 30 and the metal plate 10 constituting the antenna device and can thus perform wireless communication with the card reader 4 with the back surface b side facing the card reader 4 without being blocked by the metal plate 10. Further, the magnetic sheet 20 has the opening 21 at a position overlapping the coupling coils CC1 and CC2, so that the electromagnetic coupling between the coupling coils CC1 and CC2 is not blocked by the magnetic sheet 20. In particular, the inner diameter areas of the coupling coils CC1 and CC2 completely overlap the opening 21 of the magnetic sheet 20 in a plan view, allowing most magnetic flux to interlink with the coupling coils CC1 and CC2 without detouring around the magnetic sheet 20. In addition, the magnetic sheet 20 is directly formed on the surface of the substrate 30 to be integrated with the substrate 30, so that the number of components is reduced.

Second Embodiment

Figure 10:
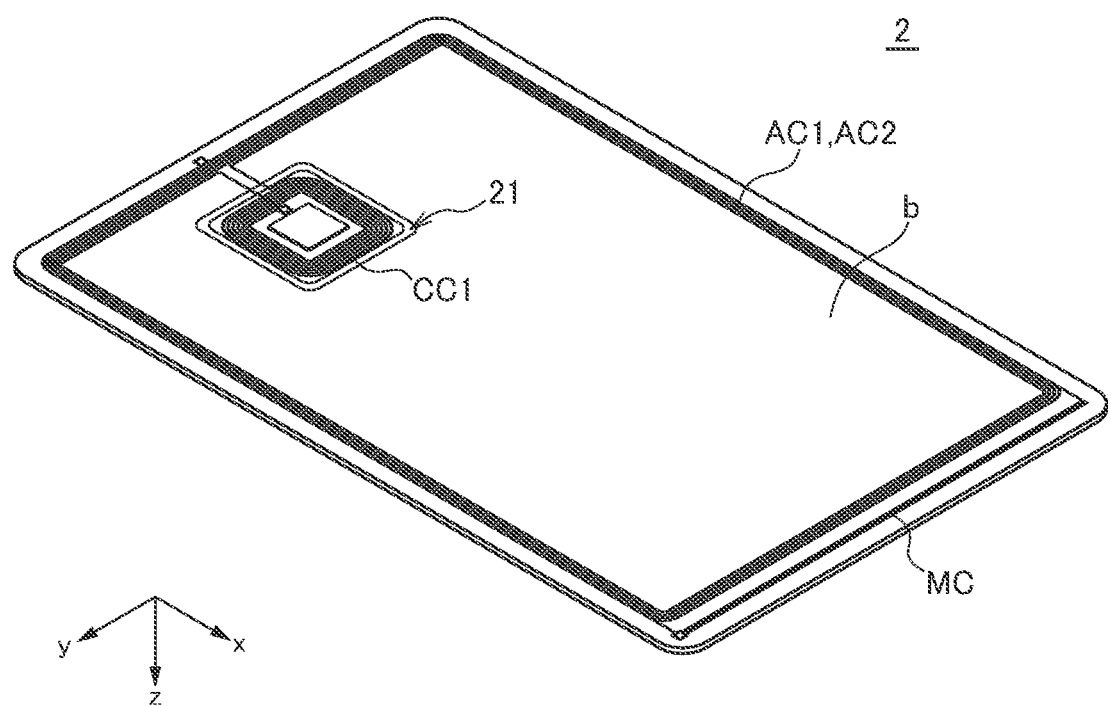
FIG. 10 is a schematic transparent perspective view of an IC card according to a second embodiment of the present invention as viewed from the back surface side.
Figure 11:
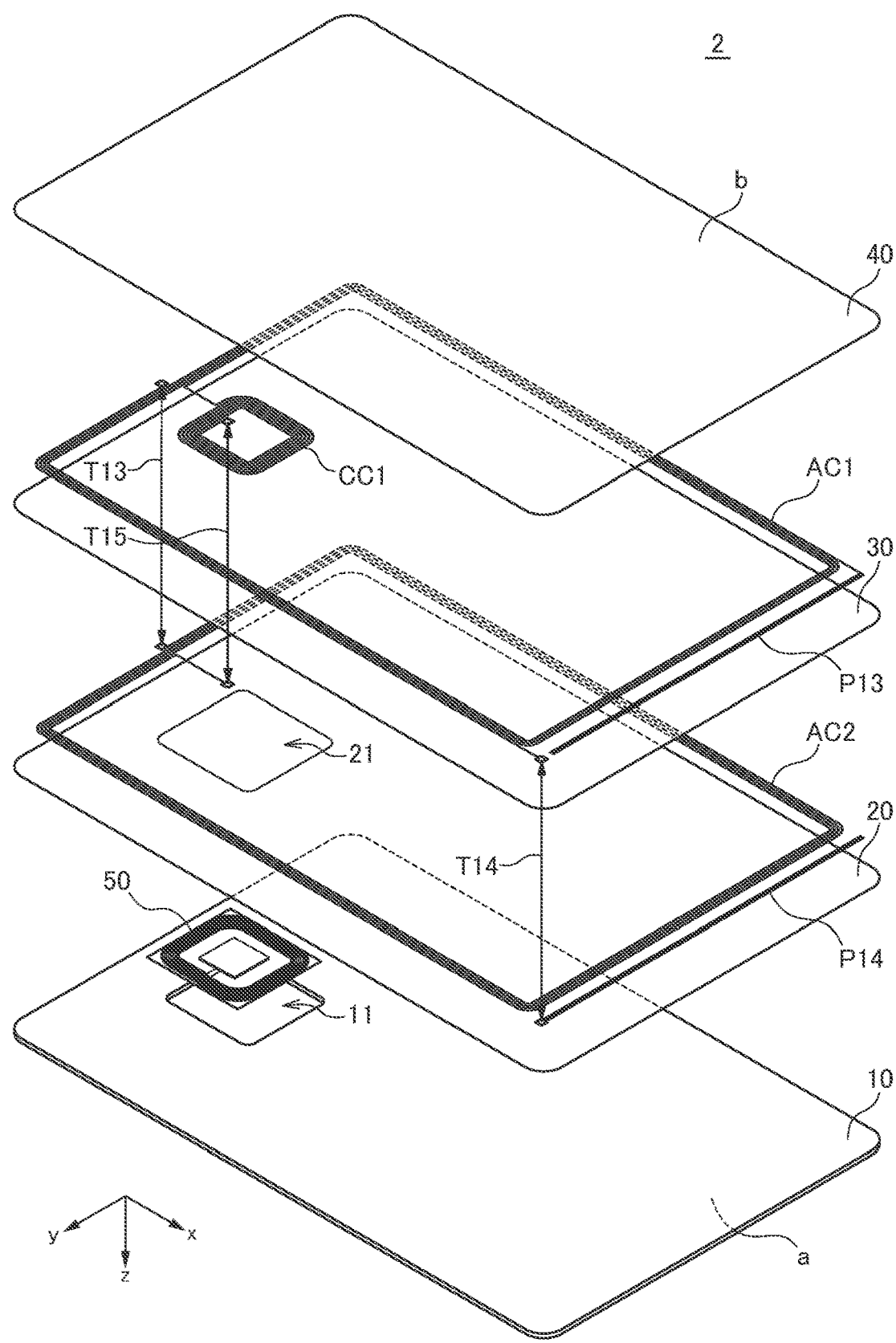
FIG. 11 is a schematic exploded perspective view of the IC card shown in FIG. 10.

FIG. 10 is a schematic transparent perspective view of an IC card 2 according to the second embodiment as viewed from the back surface b side. FIG. 11 is a schematic exploded perspective view of the IC card 2.

As illustrated in FIGS. 10 and 11, the IC card 2 according to the second embodiment differs from the IC card 1 according to the first embodiment in the shapes of conductor patterns formed on the surfaces 31 and 32 of the substrate 30. Other configurations are the same as those of the IC card 1 according to the first embodiment, so the same reference numerals are given to the same elements, and overlapping description will be omitted.

Figure 12:
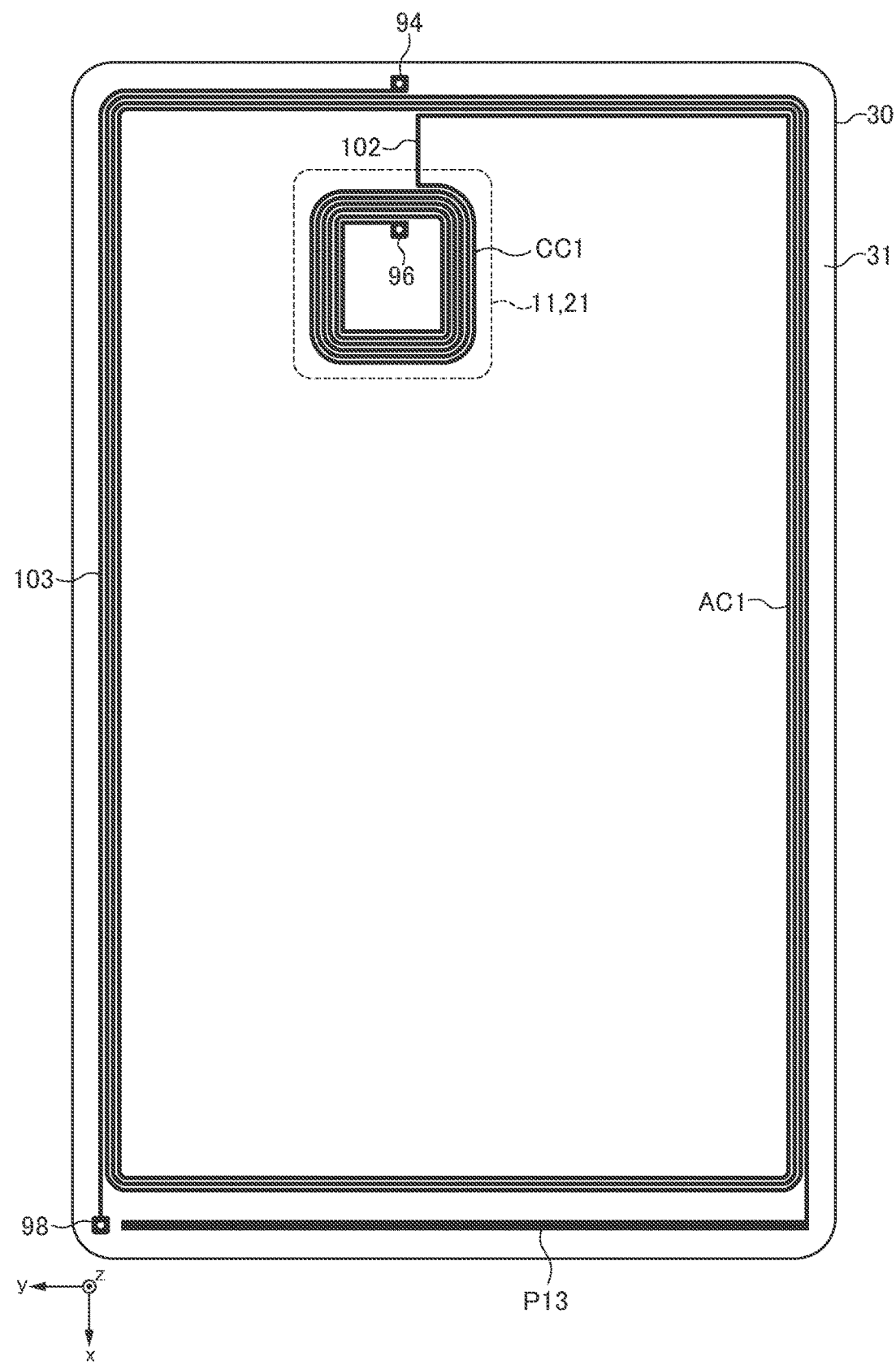
FIG. 12 is a schematic plan view illustrating a conductor pattern formed on one surface of the substrate, in the second embodiment of the present invention.
Figure 13:
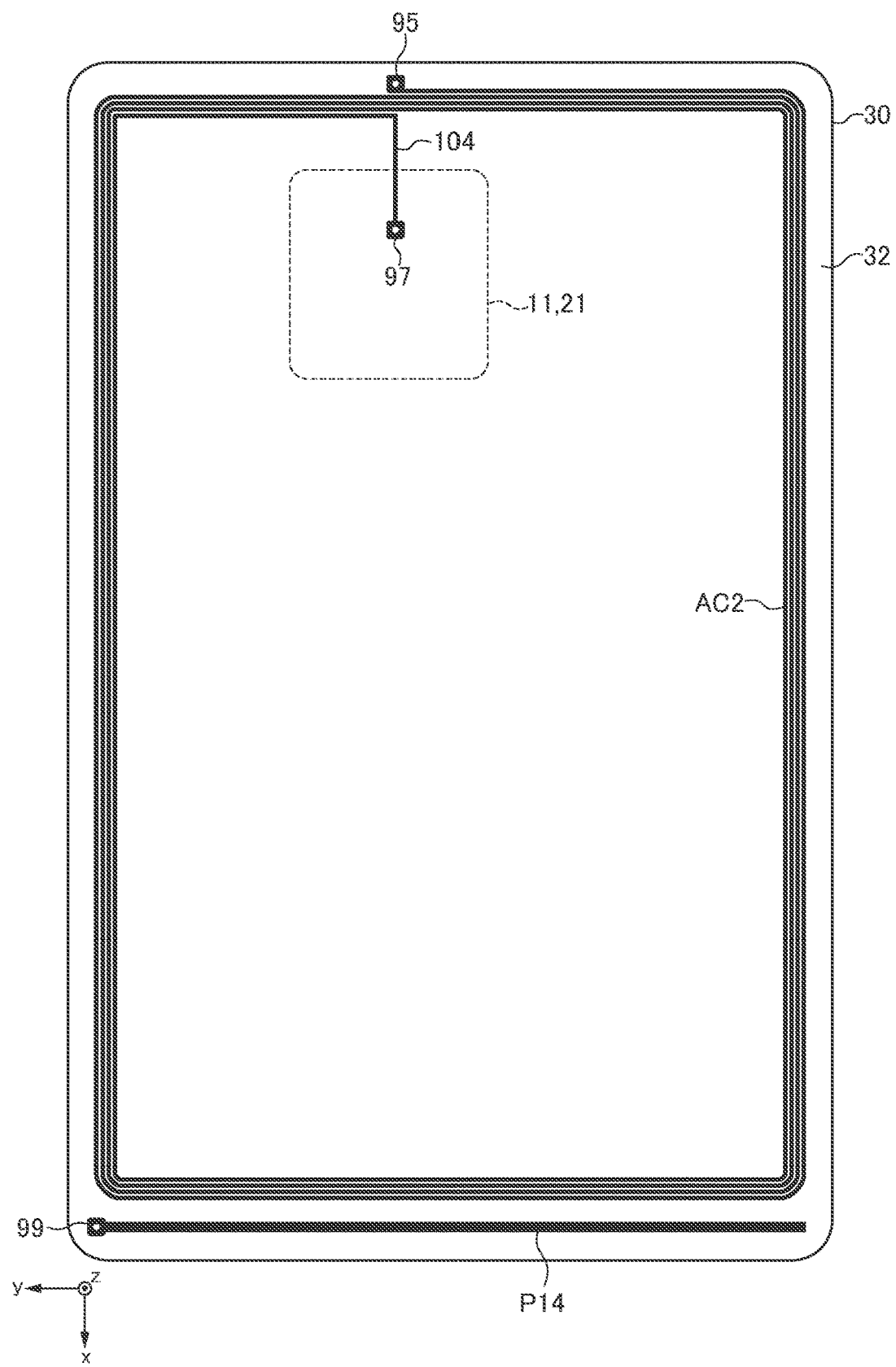
FIG. 13 is a schematic transparent plan view of a conductor pattern formed on the other surface of the substrate as viewed from the one surface side, in the second embodiment of the present invention.
Figure 14:
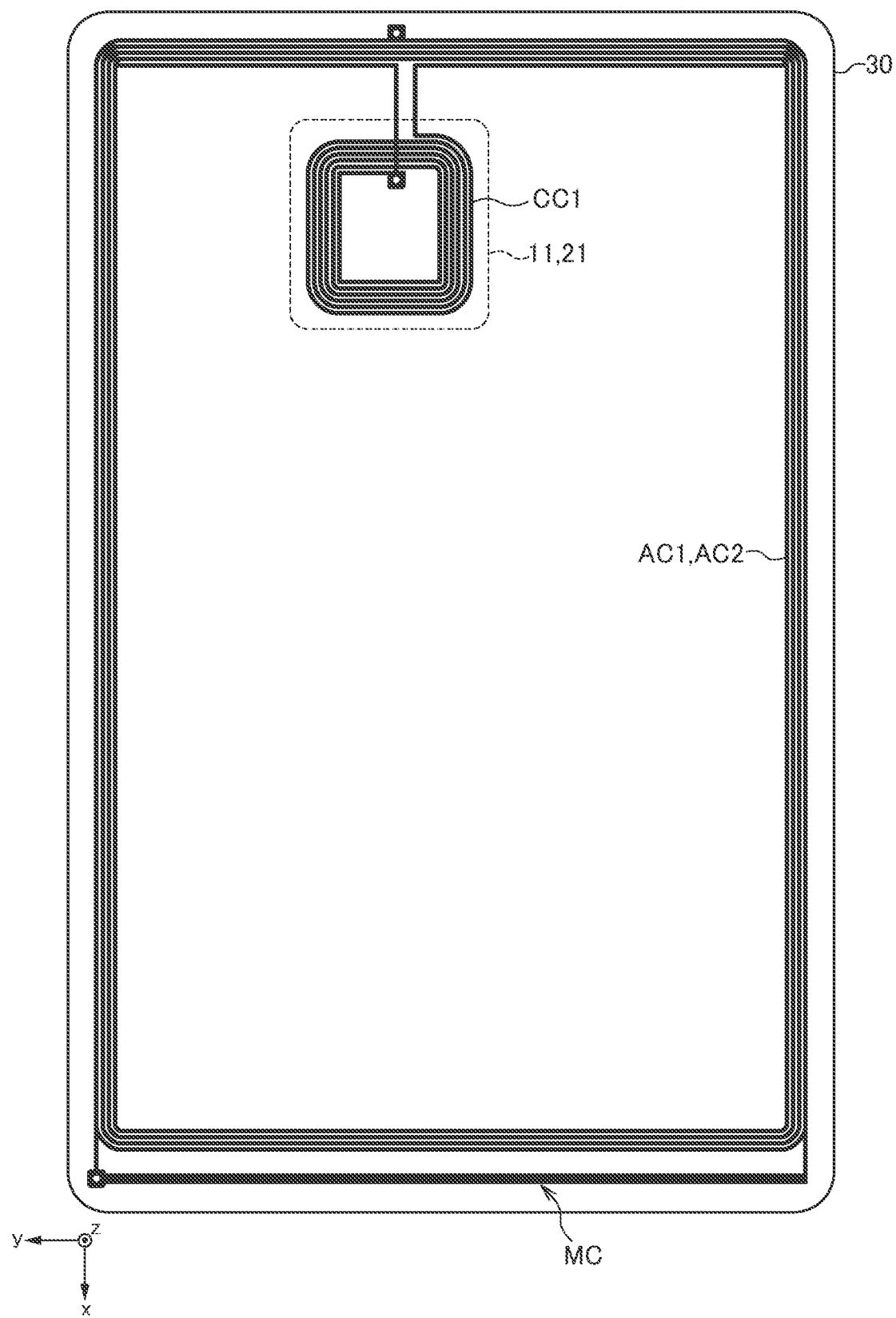
FIG. 14 is a schematic transparent plan view illustrating the conductor pattern formed on the one surface and the conductor pattern formed on the other surface in an overlapping manner, in the second embodiment of the present invention.

FIG. 12 is a schematic plan view illustrating the shape of the conductor pattern formed on the one surface 31 of the substrate 30, in the second embodiment. FIG. 13 is a schematic transparent plan view of the shape of the conductor pattern formed on the other surface 32 of the substrate 30 as viewed from the one surface 31 side, in the second embodiment. FIG. 14 is a schematic transparent plan view illustrating a state where the conductor patterns formed on the one and the other surfaces 31 and 32 of the substrate 30 overlap each other, in the second embodiment.

As illustrated in FIG. 12, the conductor pattern provided on the one surface 31 of the substrate 30 includes an antenna coil AC1, a coupling coil CC1, a capacitor electrode pattern P13, and connection patterns 102 and 103. The antenna coil AC1 is spirally wound by, e.g., four turns along the four sides of the substrate 30 having a rectangular shape. Since the antenna coil AC1 is disposed along the four sides of the substrate 30, a large part of the one surface 31 of the substrate 30 serves as the inner diameter area of the antenna coil AC1. However, the antenna coil AC1 may not necessarily be wound by a plurality of turns and may be a loop of one turn. On the other hand, the coupling coil CC1 is a coil having a smaller diameter which is disposed in the inner diameter area of the antenna coil AC1 and is spirally wound by, e.g., five turns. The coupling coil CC1 also may not necessarily be wound by a plurality of turns and may be a loop of one turn.

The inner peripheral end of the antenna coil AC1 and the outer peripheral end of the coupling coil CC1 are short-circuited through the connection pattern 102. The outer peripheral end of the antenna coil AC1 is connected to the capacitor electrode pattern P13. Further, the connection pattern 103 is disposed along the antenna coil AC1. One end of the connection pattern 103 is connected to a connection node 94, and the other end thereof is connected to a connection node 98. The connection nodes 94 and 98 are connected respectively to connection nodes 95 and 99 provided on the other surface 32 of the substrate 30 through respective through hole conductors T13 and T14 penetrating the substrate 30. On the other hand, an inner peripheral end 96 of the coupling coil CC1 is connected to a connection node 97 provided on the other surface 32 of the substrate 30 through a through hole conductor T15 penetrating the substrate 30.

As illustrated in FIG. 13, the conductor pattern formed on the other surface 32 of the substrate 30 includes an antenna coil AC2, a capacitor electrode pattern P14, and a connection pattern 104. The antenna coil AC2 is spirally wound by, e.g., four turns along the four sides of the substrate 30 having a rectangular shape. Since the antenna coil AC2 is disposed along the four sides of the substrate 30, a large part of the other surface 32 of the substrate 30 serves as the inner diameter area of the antenna coil AC2. However, the antenna coil AC2 may not necessarily be wound by a plurality of turns and may be a loop of one turn.

The outer peripheral end of the antenna coil AC2 is connected to the connection node 95, and the inner peripheral end of the antenna coil AC1 is connected to the connection node 97 through a connection pattern 104. The capacitor electrode pattern P14 is connected to the connection node 99.

With the above configuration, the antenna coil AC1, the coupling coil CC1, and the antenna coil AC2 are connected in series in this order, and the antenna coils AC1 and AC2 are connected to each other through a matching capacitor MC constituted by the capacitor electrode patterns P13 and P14. Thus, the antenna coils AC1, AC2, and the coupling coil CC1 do not each have an external terminal for direct current connection and are each a completely closed circuit in terms of direct current.

The matching capacitor MC constituted by the capacitor electrode patterns P13 and P14 is disposed offset in the positive x-direction of the substrate 30, i.e., to one short side of the substrate 30. When the coupling coil CC and the matching capacitor MC are thus disposed away from each other, mutual interference therebetween can be prevented.

Figure 15:
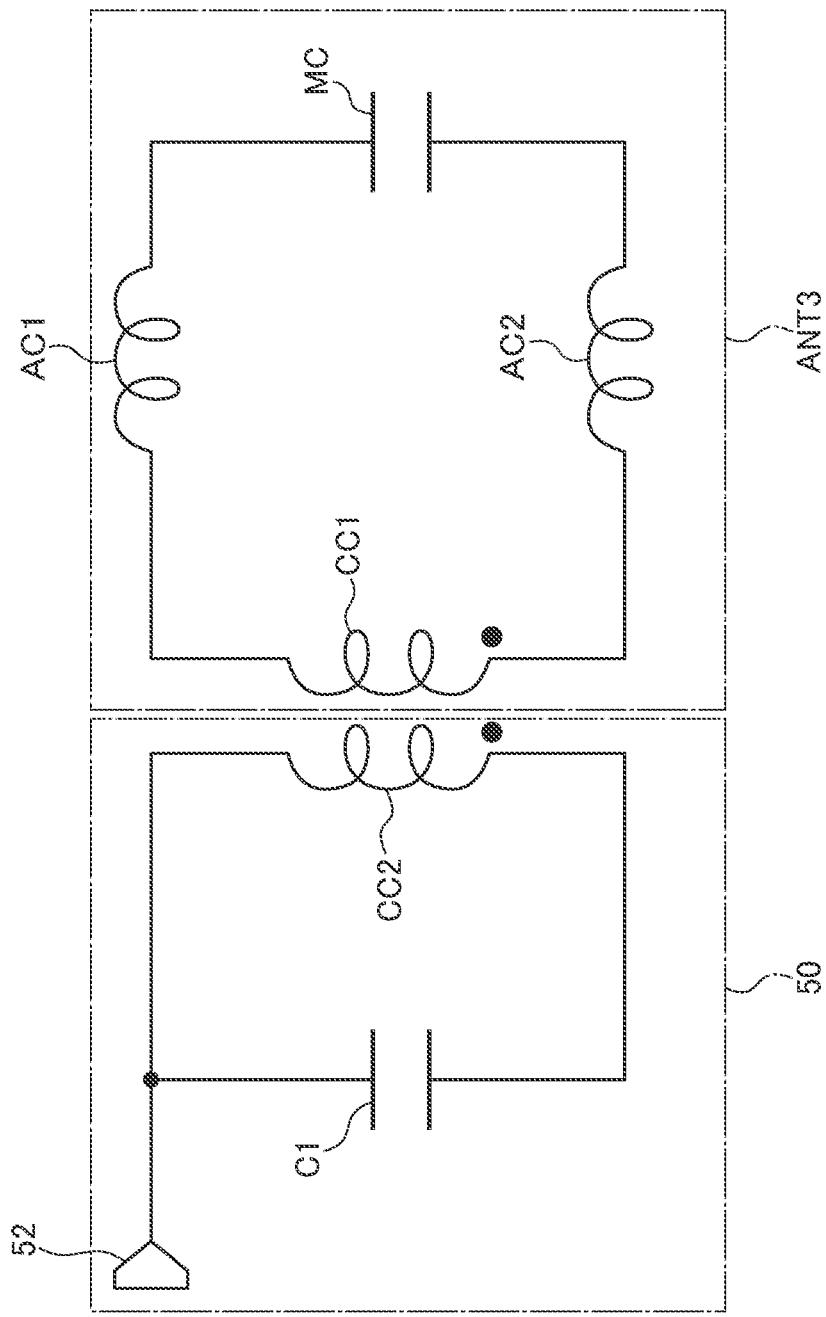
FIG. 15 is an equivalent circuit diagram of the IC card according to the second embodiment of the present invention.

FIG. 15 is an equivalent circuit diagram of the IC card 2 according to the second embodiment.

As illustrated in FIG. 15, in the second embodiment, the coupling coil CC1 is connected between one end of the antenna coil AC1 and one end of the antenna coil AC2, and the matching capacitor MC is connected between the other end of the antenna coil AC1 and the other end of the antenna coil AC2, thereby constituting a dipole type main antenna ANT3. The antenna coils AC1 and AC2 included in the main antenna ANT3 perform communication with the card reader 4 illustrated in FIG. 1. The coupling coil CC1 included in the main antenna ANT3 is electromagnetically coupled to the coupling coil CC2 included in the IC module 50.

As exemplified in the present embodiment, the antenna coil may not necessarily be constituted as a loop antenna, but may be a dipole antenna.

Third Embodiment

Figure 16:
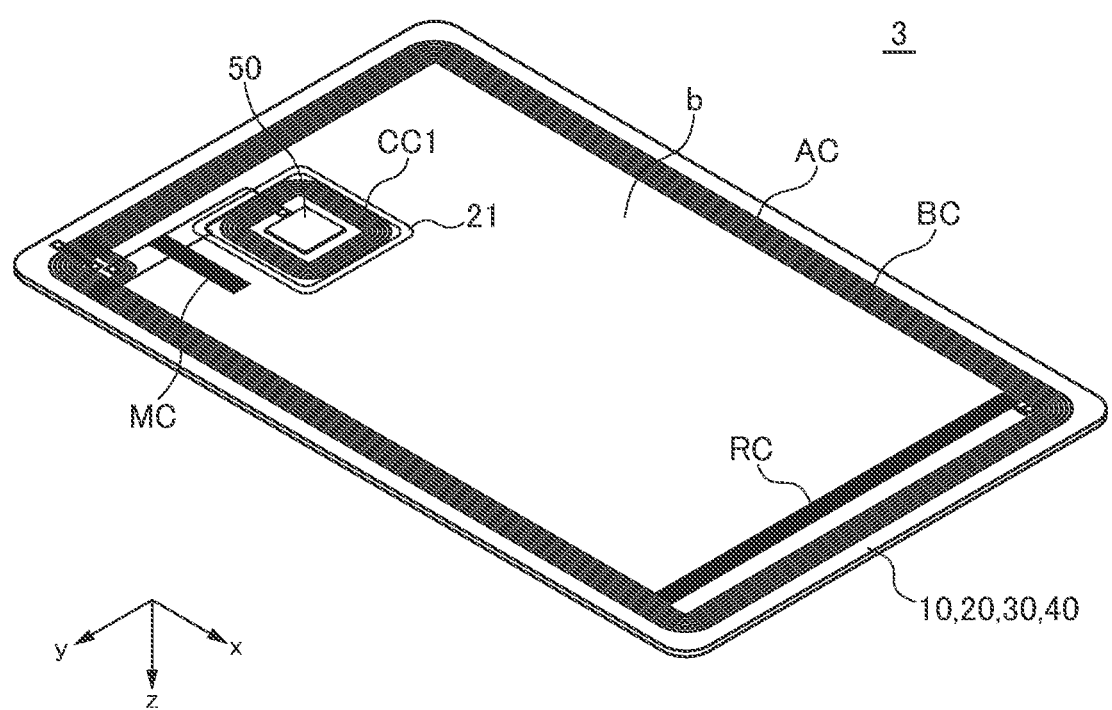
FIG. 16 is a schematic transparent perspective view of an IC card according to a third embodiment of the present invention as viewed from the back surface side.
Figure 17:
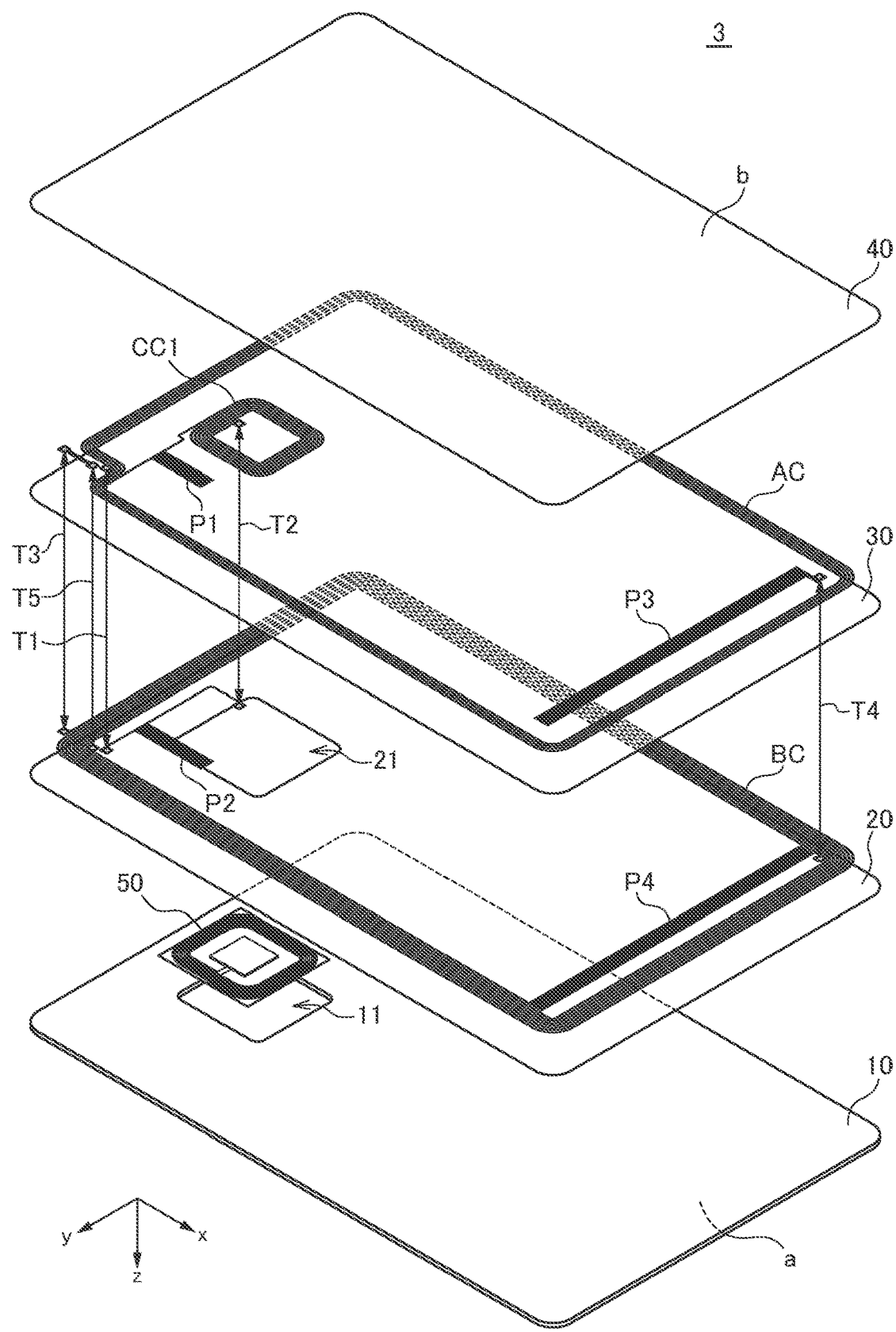
FIG. 17 is a schematic exploded perspective view of the IC card shown in FIG. 16.

FIG. 16 is a schematic transparent perspective view of an IC card 3 according to the third embodiment as viewed from the back surface b side. FIG. 17 is a schematic exploded perspective view of the IC card 3.

As illustrated in FIGS. 16 and 17, the IC card 3 according to the third embodiment differs from the IC card 1 according to the first embodiment in the shapes of conductor patterns formed on the surfaces 31 and 32 of the substrate 30. Other configurations are the same as those of the IC card 1 according to the first embodiment, so the same reference numerals are given to the same elements, and overlapping description will be omitted.

Figure 18:
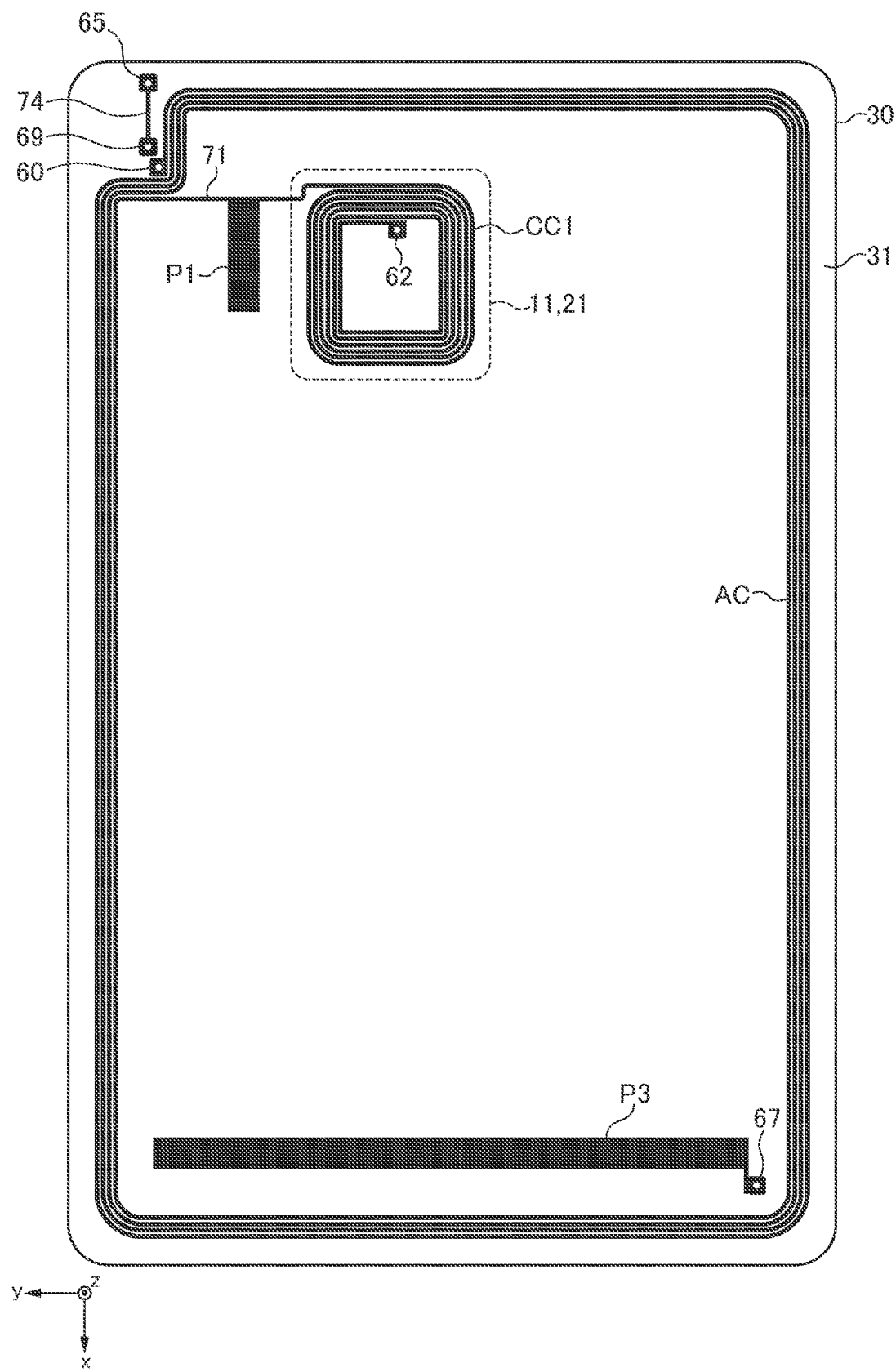
FIG. 18 is a schematic plan view illustrating a conductor pattern formed on one surface of the substrate, in the third embodiment of the present invention.
Figure 19:
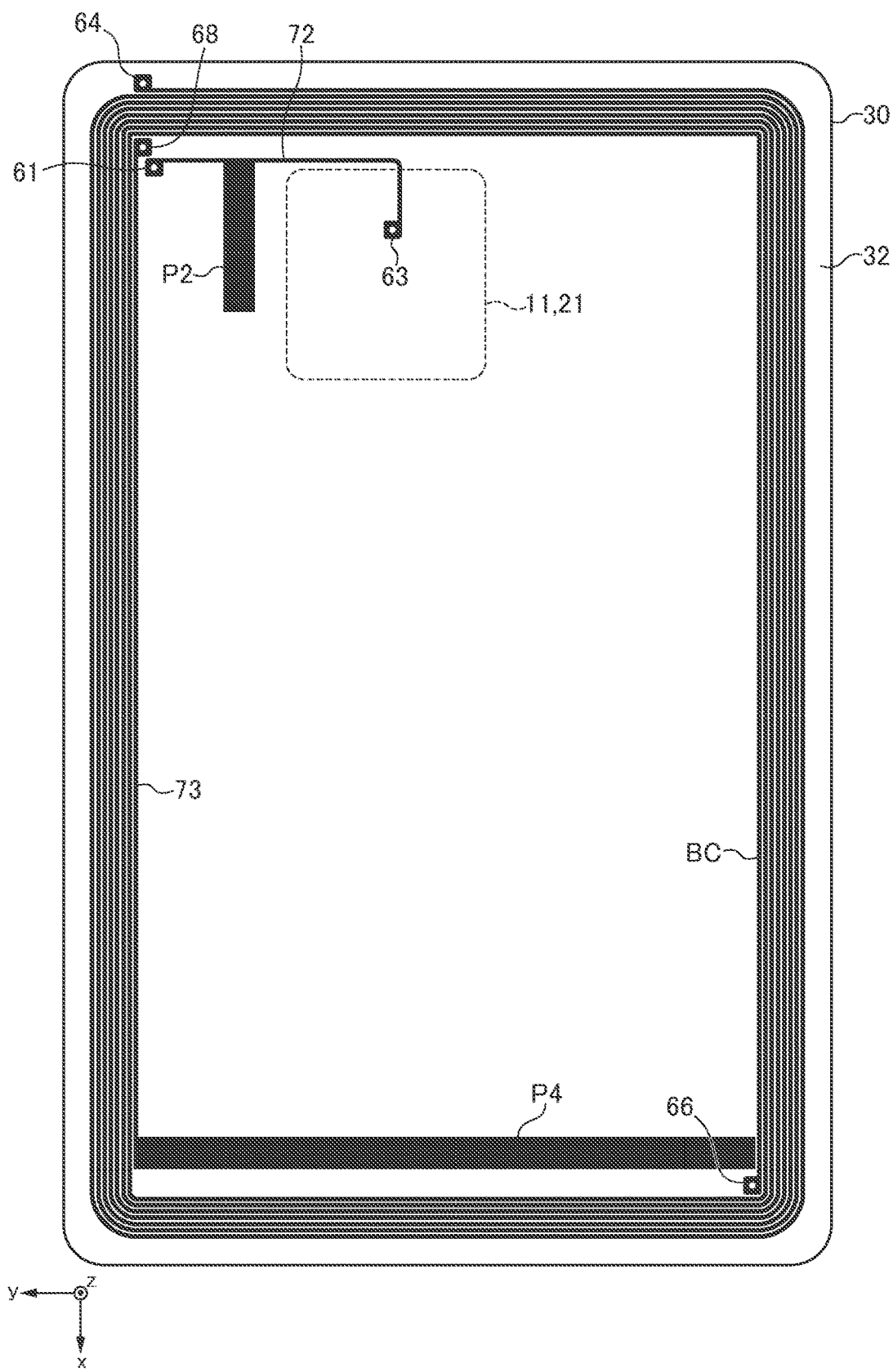
FIG. 19 is a schematic transparent plan view of a conductor pattern formed on the other surface of the substrate as viewed from the one surface side, in the third embodiment of the present invention.
Figure 20:
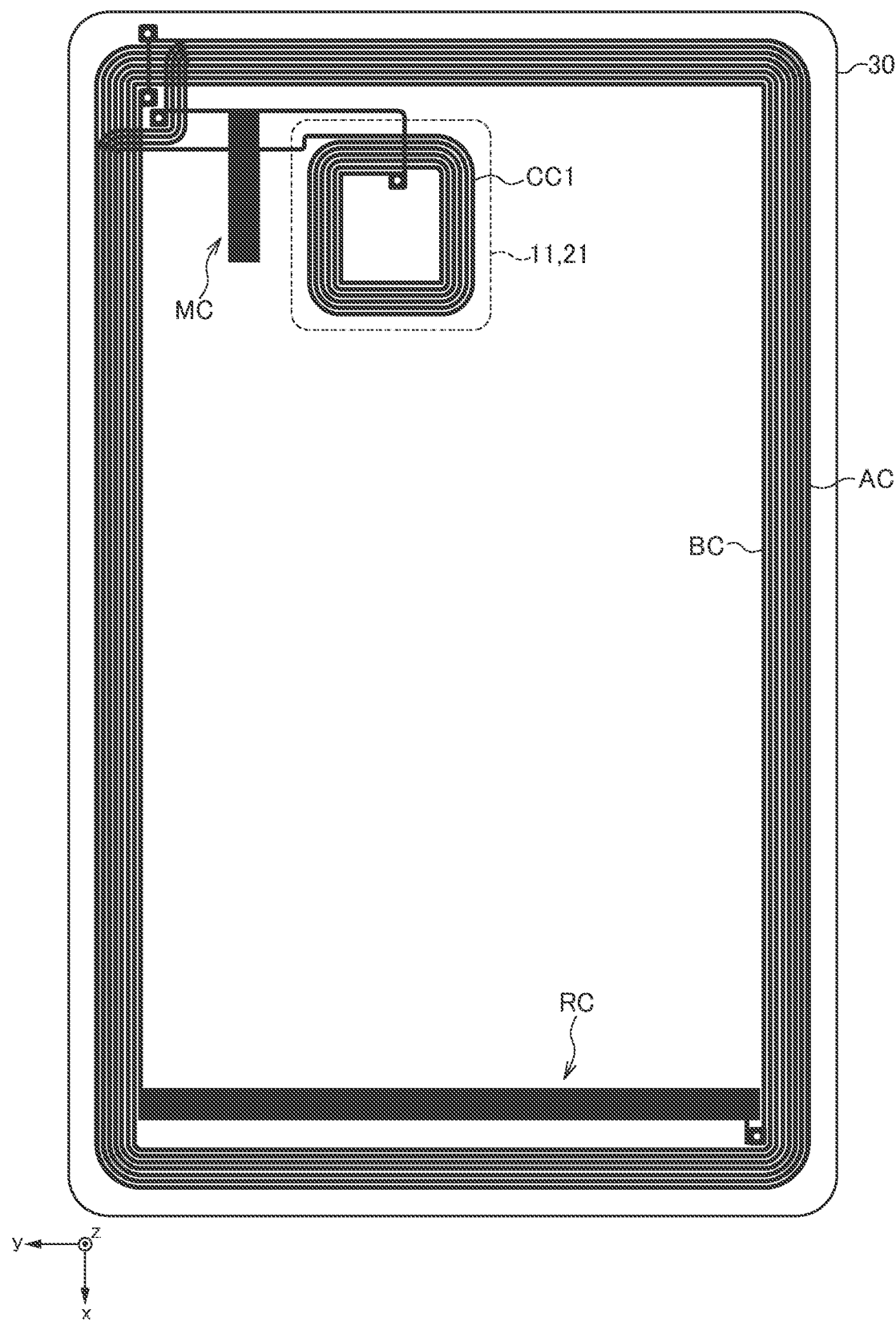
FIG. 20 is a schematic transparent plan view illustrating the conductor pattern formed on the one surface and the conductor pattern formed on the other surface in an overlapping manner, in the third embodiment of the present invention.

FIG. 18 is a schematic plan view illustrating the shape of the conductor pattern formed on the one surface 31 of the substrate 30, in the third embodiment. FIG. 19 is a schematic transparent plan view of the shape of the conductor pattern formed on the other surface 32 of the substrate 30 as viewed from the one surface 31 side, in the third embodiment. FIG. 20 is a schematic transparent plan view illustrating a state where the conductor patterns formed on the one and the other surfaces 31 and 32 of the substrate 30 overlap each other, in the third embodiment.

As illustrated in FIG. 18, the conductor pattern provided on the one surface 31 of the substrate 30 includes an antenna coil AC, a coupling coil CC1, capacitor electrode patterns P1 and P3, and connection patterns 71 and 74. The antenna coil AC is spirally wound by, e.g., four turns along the four sides of the substrate 30 having a rectangular shape. Since the antenna coil AC is disposed along the four sides of the substrate 30, a large part of the one surface 31 of the substrate 30 serves as the inner diameter area of the antenna coil AC. However, the antenna coil AC may not necessarily be wound by a plurality of turns and may be a loop of one turn. On the other hand, the coupling coil CC1 is a coil having a smaller diameter that is disposed in the inner diameter area of the antenna coil AC and is spirally wound by, e.g., five turns. The coupling coil CC1 also may not necessarily be wound by a plurality of turns and may be a loop of one turn.

The inner peripheral end of the antenna coil AC and the outer peripheral end of the coupling coil CC1 are short-circuited through the connection pattern 71. The connection pattern 71 is connected with the capacitor electrode pattern P1. An outer peripheral end 60 of the antenna coil AC is connected to a connection node 61 provided on the other surface 32 of the substrate 30 through a through hole conductor T1 penetrating the substrate 30. On the other hand, an inner peripheral end 62 of the coupling coil CC1 is connected to a connection node 63 provided on the other surface 32 of the substrate 30 through a through hole conductor T2 penetrating the substrate 30. As illustrated in FIG. 19, the connection nodes 61 and 63 are short-circuited through a connection pattern 72. The connection pattern 72 is connected to the capacitor electrode pattern P2 provided at a position overlapping the capacitor electrode pattern P1 in a plan view.

With the above configuration, the antenna coil AC and the coupling coil CC1 are connected in series, and a matching capacitor MC constituted by the capacitor electrode patterns P1 and P2 is inserted into the connecting portion therebetween. Thus, the antenna coil AC and the coupling coil CC1 do not each have an external terminal for direct current connection and are each a completely closed circuit in terms of direct current.

As illustrated in FIG. 19, the conductor pattern formed on the other surface 32 of the substrate 30 includes a booster coil BC, capacitor electrode patterns P2, P4, and connection patterns 72 and 73. The booster coil BC is spirally wound by, e.g., eight turns along the four sides of the rectangular substrate 30. Since the booster coil BC is disposed along the four sides of the substrate 30, a large part of the other surface 32 of the substrate 30 serves as the inner diameter area of the booster coil BC. Since the booster coil BC and the antenna coil AC overlap each other in a plan view, they are electromagnetically coupled to each other.

An outer peripheral end 64 of the booster coil BC is connected to a connection node 65 provided on the one surface 31 of the substrate 30 through a through hole conductor T3 penetrating the substrate 30. An inner peripheral end 66 of the booster coil BC is connected to a connection node 67 provided on the one surface 31 of the substrate 30 through a through hole conductor T4 penetrating the substrate 30. The connection node 67 is connected to the capacitor electrode pattern P3. The capacitor electrode pattern P4 is provided on the other surface 32 of the substrate 30 at a position overlapping the capacitor electrode pattern P3, and a resonance capacitor RC is constituted by the capacitor electrode patterns P3 and P4. The capacitor electrode pattern P4 is connected to the connection node 68 through the connection pattern 73. The connection node 68 is connected to a connection node 69 provided on the one surface 31 of the substrate 30 through a through hole conductor T5 penetrating the substrate 30. The connection nodes 65 and 69 are short-circuited through the connection pattern 74.

With the above configuration, the booster coil BC and the resonance capacitor RC are connected in series. Thus, the booster coil BC does not each have an external terminal for direct current connection and is a completely closed circuit in terms of direct current.

The resonance capacitor RC constituted by the capacitor electrode patterns P3 and P4 is disposed offset in the positive x-direction of the substrate 30, i.e., to one short side of the substrate 30. When the resonance capacitor RC is disposed at a position away from the coupling coil CC1 and matching capacitor MC, mutual interference therebetween can be prevented.

Figure 21:
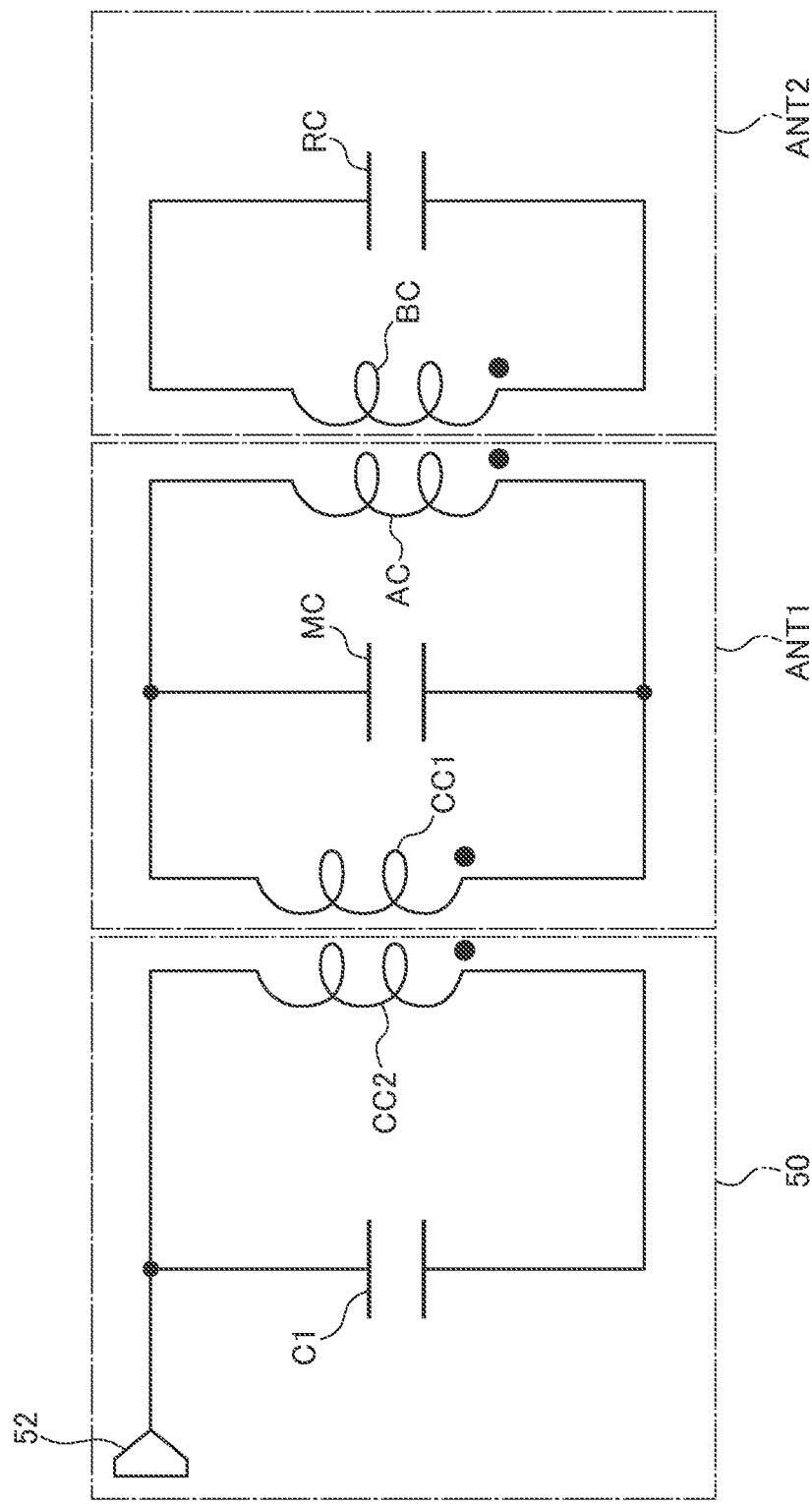
FIG. 21 is an equivalent circuit diagram of the IC card according to the third embodiment of the present invention.

FIG. 21 is an equivalent circuit diagram of the IC card 3 according to the third embodiment.

As illustrated in FIG. 21, in the third embodiment, one end of the antenna coil AC and one end of the coupling coil CC1 are connected to each other, the other end of the antenna coil AC and the other end of the coupling coil CC1 are connected to each other, and the matching capacitor MC is connected to these connection points, thereby constituting a main antenna ANT1. The coupling coil CC1 included in the main antenna ANT1 is electromagnetically coupled to the coupling coil CC2 included in the IC module 50.

The antenna coil AC included in the main antenna ANT1 not only performs communication with the card reader 4 illustrated in FIG. 1 but also is electromagnetically coupled to the booster coil BC. The booster coil BC and the resonance capacitor RC constitute an auxiliary antenna ANT2. The IC card 3 according to the present embodiment performs communication with the card reader 4 using the main antenna ANT1 and auxiliary antenna ANT2 and can thus extend its communication distance.

For extending the communication distance, a method of not using the booster coil BC but increasing the number of turns of the antenna coil AC is considered to be effective; however, the increase in the number of turns of the antenna coil AC brings about an increase in the resistance component of the antenna coil AC, resulting in a large loss. In particular, in the present embodiment, the antenna coil AC and coupling coil CC1 are connected in series and, accordingly, the resistance components of the two coils are added together, thus making it difficult to increase the number of turns of the antenna coil AC while suppressing a loss due to such a resistance component.

On the other hand, in the present embodiment, not the number of turns of the antenna coil AC is increased, but the booster coil BC electromagnetically coupled to the antenna coil AC is used, so that it is possible to extend the communication distance without increasing the resistance component. In addition, in the present embodiment, the number of turns of the booster coil BC is larger than the number of turns of the antenna coil AC, so that it is possible to further reduce the resistance component of the antenna coil AC and to enhance the characteristics of the auxiliary antenna ANT2 using the booster coil BC.

As described above, the IC card 3 according to the present embodiment has the booster coil BC electromagnetically coupled to the antenna coil AC, so that it is possible to ensure a sufficient communication distance while suppressing the resistance component of the antenna coil AC.

It is apparent that the present invention is not limited to the above embodiments, but may be modified and changed without departing from the scope and spirit of the invention.

For example, although the matching capacitor MC or resonance capacitor RC is formed by the capacitor electrode patterns formed respectively on both surfaces of the substrate 30 in the above embodiments, one or both of the capacitor electrode patterns may be a chip-type capacitor component.

What is claimed is:

1. An IC card comprising:
   an antenna device comprising:
      a substrate;
      a conductor pattern formed on the substrate; and
      a magnetic sheet formed on the substrate;
   a metal plate provided overlapping the antenna device; and
   an IC module electromagnetically coupled to a coupling coil,
      wherein the conductor pattern includes a spiral or loop-shaped antenna coil and a spiral or loop-shaped coupling coil,
      wherein the coupling coil is located on a first surface of the substrate,
      wherein the antenna coil is located on a second surface of the substrate opposite the first substrate,
      wherein the coupling coil is connected to the antenna coil via corresponding connection nodes located on the first surface and the second surface, and
      wherein the coupling coil has a diameter smaller than that of the antenna coil,
      wherein the antenna coil overlaps the magnetic sheet,
      wherein the magnetic sheet has a first opening at a position overlapping the coupling coil such that an inner diameter area of the coupling coil completely overlaps the first opening in a plan view,
      wherein the metal plate has a second opening,
      wherein the IC module is disposed in the second opening, and
      wherein the coupling coil and the IC module are electromagnetically coupled through the first opening.

2. An apparatus comprising:
   a substrate having first and second surfaces opposite to each other;
   a first coil pattern formed on the first surface of the substrate;
   a second coil pattern formed on the second surface and connected to the first coil pattern via corresponding connection nodes located on the first surface and the second surface, the second coil pattern being formed such that the second coil pattern is surrounded by the first coil pattern in a plan view; and
   a magnetic sheet formed on the first surface of the substrate such that the magnetic sheet covers the first coil pattern,
      wherein a magnetic sheet has a first opening overlapping the second coil pattern so as not to cover the second coil pattern in a plan view.

3. The apparatus as claimed in claim 2, wherein the second coil pattern is formed on the second surface of the substrate.

4. The apparatus as claimed in claim 3, further comprising:
   a first through hole conductor penetrating the substrate and connected between an outer peripheral end of the first coil pattern and one of inner and outer peripheral ends of the second coil pattern, wherein the connection nodes are connected to each other via the first through hole conductor; and
   a second through hole conductor penetrating the substrate and connected between an inner peripheral end of the first coil pattern and other of the inner and outer peripheral ends of the second coil pattern.

5. The apparatus as claimed in claim 4, further comprising:
   a first capacitor electrode pattern formed on the first surface of the substrate and connected to the inner peripheral end of the first coil pattern; and
   a second capacitor electrode pattern formed on the second surface of the substrate and connected to the outer peripheral end of the second coil pattern, wherein the second capacitor electrode pattern overlaps the first capacitor electrode pattern.

6. The apparatus as claimed in claim 3, further comprising a third coil pattern formed on the second surface of the substrate such that the third coil pattern surrounds the second coil pattern, wherein the first, second, and third coil patterns are connected in series in this order.

7. The apparatus as claimed in claim 6, wherein an outer peripheral end of the second coil pattern is connected to an inner peripheral end of the third coil pattern, and wherein an inner peripheral end of the second coil pattern is connected to an inner peripheral end of the first coil pattern.

8. The apparatus as claimed in claim 7, further comprising:
   a first capacitor electrode pattern formed on the first surface of the substrate and connected to outer peripheral end of one of the first and third coil patterns; and
   a second capacitor electrode pattern formed on the second surface of the substrate and connected to outer peripheral end of other of the first and third coil patterns,
      wherein the second capacitor electrode pattern overlaps the first capacitor electrode pattern.

9. The apparatus as claimed in claim 2, further comprising:
   a metal plate having a second opening; and
   an IC module having a fourth coil pattern,
      wherein the magnetic sheet is disposed between the substrate and the metal plate,
      wherein the first opening of the magnetic sheet overlaps the second opening of the metal plate, and
      wherein the IC module is disposed within the second opening such that the second coil pattern and the fourth coil pattern are electromagnetically coupled to each other through the first opening.

* * * * *